(12) United States Patent
Tolkacz et al.

(10) Patent No.: US 9,797,113 B2
(45) Date of Patent: Oct. 24, 2017

(54) MOTOR GRADER IMPLEMENT VALVE LAYOUT FOR NARROW FRONT CAB

(71) Applicant: Caterpillar Inc., Peoria, IL (US)

(72) Inventors: Allison Tolkacz, Rochester Hills, MI (US); Kevin Welty, Washington, IL (US); Brad Van De Veer, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 397 days.

(21) Appl. No.: 14/537,133

(22) Filed: Nov. 10, 2014

(65) Prior Publication Data

US 2016/0130782 A1  May 12, 2016

(51) Int. Cl.
*E02F 9/20* (2006.01)
*B62D 33/06* (2006.01)
*E02F 3/76* (2006.01)
*E02F 9/08* (2006.01)
*E02F 9/16* (2006.01)

(52) U.S. Cl.
CPC ............ *E02F 9/2004* (2013.01); *B62D 33/06* (2013.01); *E02F 3/7636* (2013.01); *E02F 9/0875* (2013.01); *E02F 9/163* (2013.01)

(58) Field of Classification Search
CPC ....... E02F 9/2004; E02F 9/0875; E02F 9/163; B62C 33/06
See application file for complete search history.

(56) References Cited

U.S. PATENT DOCUMENTS

| 3,759,333 | A | | 9/1973 | Rivinius | |
|---|---|---|---|---|---|
| 3,965,771 | A | | 6/1976 | MacDonald | |
| 4,664,220 | A | * | 5/1987 | Ruhter | E02F 9/2004 172/793 |
| 4,664,221 | A | * | 5/1987 | Loney | E02F 9/2004 172/793 |
| 4,706,776 | A | * | 11/1987 | Hyoki | B62D 1/18 180/334 |
| 4,733,745 | A | | 3/1988 | Lumpkins | |
| 4,736,647 | A | * | 4/1988 | Shimoie | E02F 9/2004 137/635 |
| 4,821,837 | A | * | 4/1989 | Fifer | E02F 9/2004 180/315 |
| 5,056,985 | A | * | 10/1991 | Johnson | E02F 9/2004 414/694 |
| 5,125,232 | A | * | 6/1992 | Arii | E02F 9/2004 137/596.15 |
| 5,138,756 | A | * | 8/1992 | Johnson | E02F 9/2004 137/289 |
| 5,632,353 | A | * | 5/1997 | Kimberley | B60K 35/00 180/326 |
| 6,499,205 | B1 | * | 12/2002 | Laffan | E02F 9/2004 137/270 |

(Continued)

*Primary Examiner* — James A English
(74) *Attorney, Agent, or Firm* — James S. Bennin

(57) ABSTRACT

An implement valve layout associated with a machine, such as a motor grader, is provided to perform control and actuation of valves associated with a hydraulic valve block. The implement valve layout may include a control lever system having linkages and bell cranks for actuating valves of the hydraulic valve block located below a floor of the narrow front cab. An auxiliary implement valve layout may provide a second control lever system including linkages that actuate additional valves associated with the hydraulic valve block.

20 Claims, 17 Drawing Sheets

(56) References Cited

U.S. PATENT DOCUMENTS

| | | | |
|---|---|---|---|
| 7,243,982 B2 * | 7/2007 | Kelley | E02F 9/163 296/190.08 |
| 7,878,261 B2 | 2/2011 | Masumoto | |
| 8,225,693 B2 * | 7/2012 | Hanson | B66F 9/20 74/523 |
| 8,657,052 B2 | 2/2014 | Sakatani | |

* cited by examiner

MOTOR GRADER IMPLEMENT VALVE LAYOUT FOR NARROW FRONT CAB

TECHNICAL FIELD

The disclosure relates generally to a control lever system for a machine, and more particularly to an implement valve layout for controlling a machine, such as for example, a motor grader.

BACKGROUND

An operator's cab for a machine typically includes a number of controls for operating the working tools on the machine. For example, one known motor grader uses sixteen different control levers to operate the motor grader work tool. Typically motor graders include controls to steer the wheels of the grader, position the blade, and articulate the front frame of the grader, among other operations. The controls extend across the front of the operator's cab for easy access by the operator. Because so many controls are placed in front of the operator, operating cabs are typically confined to a generally square configuration. However, since the operator sits behind the controls, the operator may not have a view of the work tool and/or the front wheels of the motor grader due to the location of the front vertical support bars of the square configuration cabs. Accordingly, during use, to get a proper view of the work tool, an operator may be required to stand or otherwise move within the operator's cab to a position where he has increased visibility.

U.S. Pat. No. 7,243,982 discloses an operator's cab including a narrow front cab to improve the visibility of an operator controlling a work machine, such as a motor grader. Components such as the front wheels and/or blade of the motor grader may be more visible to the operator compared with cabs with a generally square configuration. However, the control levers that extend across the front of the operator's cab, as used in square configuration cabs in the related art, no longer provide acceptable levels of ingress and egress when applied to narrow front cab configurations. Additionally, the arrangement and bulk associated with control levers in the related art may block visibility to the front wheels and/or blade when applied to narrow front cab configurations, thereby reducing or eliminating visibility benefits associated with the narrow front cab configuration. Accordingly, there is a need for an improved implement valve layout for narrow front cabs using a plurality of control levers.

SUMMARY

In one aspect, the disclosure describes a control lever system for a machine. The control lever system may include a support column including an upper portion and a lower portion, a first support shaft connected to the upper portion of the support column, and a second support shaft connected to the lower portion of the support column. The control lever system may also include at least one control lever rotatably supported on the first support shaft, at least one bell crank rotatably supported on the second support shaft; and a hydraulic valve block mounted below a floor of the machine. A first linkage may be attached to the at least one control lever and to the at least one bell crank to translate motion from the at least one control lever to the at least one bell crank. A second linkage may be attached to the at least one bell crank and the hydraulic valve block to translate motion from the at least one bell crank in order to adjust an operating position of a hydraulic control valve of the hydraulic valve block mounted below the floor of the machine.

In another aspect, the disclosure describes an operator cab of a machine including a control lever system. The operator cab may include a frame having a pair of front vertical support bars, a pair of side support bars, and a floor extending at least between the pair of front vertical support bars and pair of side support bars. The operator cab may include a support column mounted to the frame, the support column including an upper portion and a lower portion, a first support shaft connected to the upper portion of the support column, and a second support shaft connected to the lower portion of the support column. The operator cab may include at least one control lever rotatably supported on the first support shaft, at least one bell crank rotatably supported on the second support shaft; and a hydraulic valve block mounted below the floor of the frame. A width of the pair of front vertical support bars may be smaller than a width of the pair of side support bars, and a width of the floor may narrow in a forward direction of the operator cab. A first linkage may be attached to the at least one control lever and to the at least one bell crank to translate motion from the at least one control lever to the at least one bell crank. A second linkage may be attached to the at least one bell crank and the hydraulic valve block to translate motion from the at least one bell crank in order to adjust an operating position of the hydraulic valve block mounted below the floor of the frame.

In another aspect, the disclosure describes a motor grader with a narrow front end operator cab. The motor grader may include a front frame section supporting a blade assembly and a rear frame section including an engine compartment. The motor grader may include a cab frame of the narrow front end operator cab, a pair of front vertical support bars, a pair of side support bars, and a floor extending at least between the pair of front vertical support bars and pair of side support bars. The motor grader may include a support column mounted to the cab frame, the support column including an upper portion and a lower portion, a first support shaft connected to the upper portion of the support column, and a second support shaft connected to the lower portion of the support column. The motor grader may include at least one control lever rotatably supported on the first support shaft, at least one bell crank rotatably supported on the second support shaft; and a hydraulic valve block mounted below the floor of the cab frame. A width of the pair of front vertical support bars may be smaller than a width of the pair of side support bars, and a width of the floor may narrow in a forward direction of the narrow front end operator cab. A first linkage may be attached to the at least one control lever and to the at least one bell crank to translate motion from the at least one control lever to the at least one bell crank. A second linkage may be attached to the at least one bell crank and the hydraulic valve block to translate motion from the at least one bell crank in order to adjust an operating position of the hydraulic valve block mounted below the floor of the cab frame.

In one aspect, the disclosure describes an auxiliary control system for a machine. The auxiliary control system may include a control support shaft, at least one control lever rotatably supported on the control support shaft, and a hydraulic valve block mounted below the floor of the machine. An actuation member may be attached to the at least one control lever to translate motion from the at least one control lever to adjust an operating position of a hydraulic control valve of the hydraulic valve block mounted below the floor of the machine.

In another aspect, the disclosure describes an operator cab of a machine including an auxiliary control lever system. The operator cab may include a frame having a pair of front vertical support bars, a pair of side support bars, and a floor extending at least between the pair of front vertical support bars and pair of side support bars. The operator cab may also include a control support shaft, at least one auxiliary control lever rotatably supported on the control support shaft, and a hydraulic valve block mounted below the floor of the machine. A width of the pair of front vertical support bars may be smaller than a width of the pair of side support bars, and a width of the floor may narrow in a forward direction of the operator cab. An actuation member may be attached to the at least one auxiliary control lever to translate motion from the at least one auxiliary control lever to adjust an operating position of a first hydraulic control valve of the hydraulic valve block mounted below the floor of the machine. The floor may include an opening for the actuation member to pass through the floor to the first hydraulic control valve, and the opening may be laterally offset from a longitudinal axis of the operator cab.

In another aspect, the disclosure describes a motor grader with a narrow front end operator cab. The motor grader may include a front frame section supporting a blade assembly, a rear frame section including an engine compartment, and a cab frame located between the front frame section and the rear frame section, the cab frame including a pair of front vertical support bars, a pair of side support bars, and a floor extending at least between the pair of front vertical support bars and pair of side support bars. The motor grader may also include a control support shaft, at least one auxiliary control lever rotatably supported on the control support shaft, and a hydraulic valve block mounted below the floor of the cab frame. A width of the pair of front vertical support bars may be smaller than a width of the pair of side support bars, and a width of the floor may narrow in a forward direction of the narrow front end operator cab. An actuation member may be attached to the at least one auxiliary control lever to translate motion from the at least one auxiliary control lever to adjust an operating position of a first hydraulic control valve of the hydraulic valve block mounted below the floor of the machine. The floor may include an opening for the actuation member to pass through the floor to the first hydraulic control valve, and the opening may be laterally offset from a longitudinal axis of the narrow front end operator cab.

DETAILED DESCRIPTION

Figure 1:
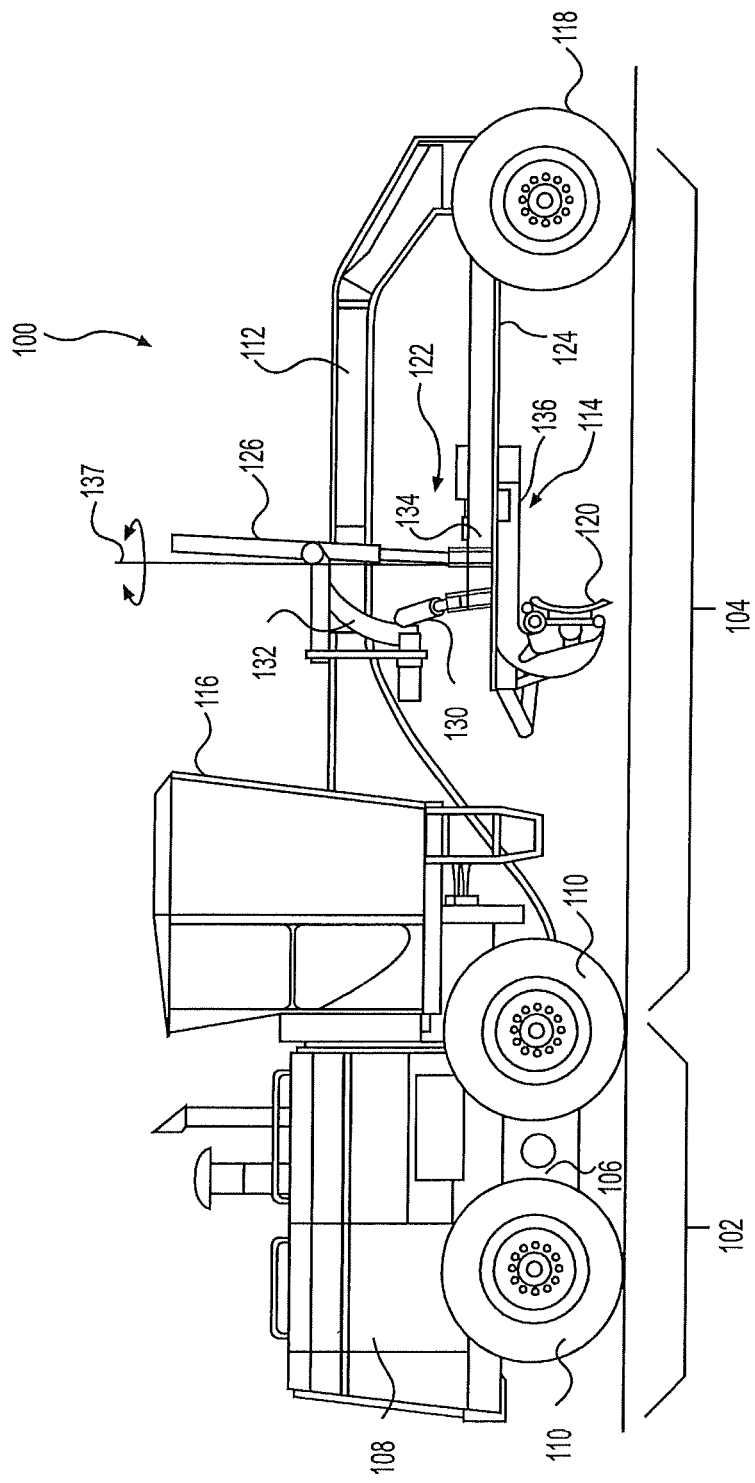
FIG. 1 is a side view of an exemplary machine with a narrow front operator cab.
Figure 2:
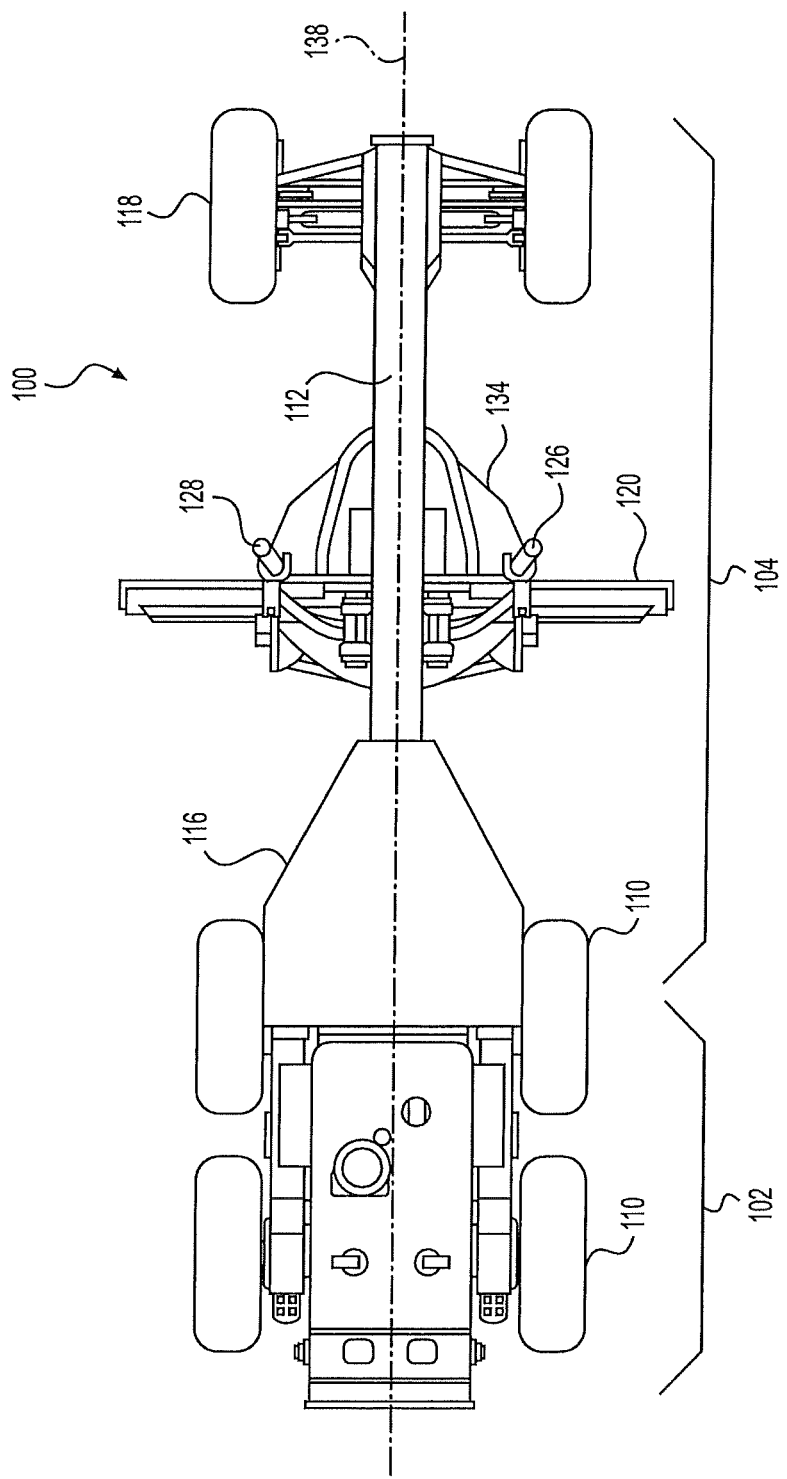
FIG. 2 is a top view of the exemplary machine of FIG. 1.

Now referring to the drawings, wherein like reference numbers refer to like elements, a machine 100, which may be a motor grader, is illustrated in FIGS. 1 and 2. The machine 100 includes a rear frame section 102 and a front frame section 104. The rear frame section 102 includes a rear frame 106 and an engine in an engine compartment 108. The engine in the engine compartment 108 is mounted on the rear frame 106 and drives or powers rear wheels 110 on the machine 100. While this particular aspect is a motor grader, it is understood that the disclosed operator's cab may have applications in other work machines.

The front frame section 104 includes a front frame 112, a blade assembly 114, and an operator cab 116. The front frame 112 extends from front wheels 118 to the rear wheels 110 and supports the operator cab 116. The operator cab 116 may contain the many controls necessary to operate the machine 100.

The blade assembly 114 includes a blade 120 and a linkage assembly 122 that allows the blade 120 to be moved into a variety of different positions relative to the machine 100. The linkage assembly 122 includes a drawbar 124, a right lift cylinder 126, a left lift cylinder 128 (FIG. 2), a center shift cylinder 130, and a coupling 132.

The drawbar 124 is mounted to the front frame 112, and its position is controlled by the right lift cylinder 126, the left lift cylinder 128, and the center shift cylinder 130. The coupling 128 connects the three cylinders 126, 128, and 130 to the front frame 112. The coupling 128 can be moved during blade repositioning, but is fixed stationary during earthmoving operations. The height of the blade 120 is controlled primarily with the right and left lift cylinders 126, 128. The right and left lift cylinders 126, 128 may be controlled independently and, thus, may be used to angle the blade 120 relative to the ground. The center shift cylinder 130 is used primarily to sideshift the drawbar 124, and all the components mounted to the end of the drawbar 124, relative to the front frame 112.

The drawbar 124 includes a large, flat plate, commonly referred to as a yoke plate 134, as shown in FIG. 2. Beneath the yoke plate 134 is a large gear or circle 136 (FIG. 1). The circle 136 may be rotated using methods known in the art to pivot the blade 120 about a blade axis 137 to establish a blade cutting angle. The machine 100 includes a longitudinal axis 138 that defines a centerline of the motor grader in this exemplary aspect.

Figure 3:
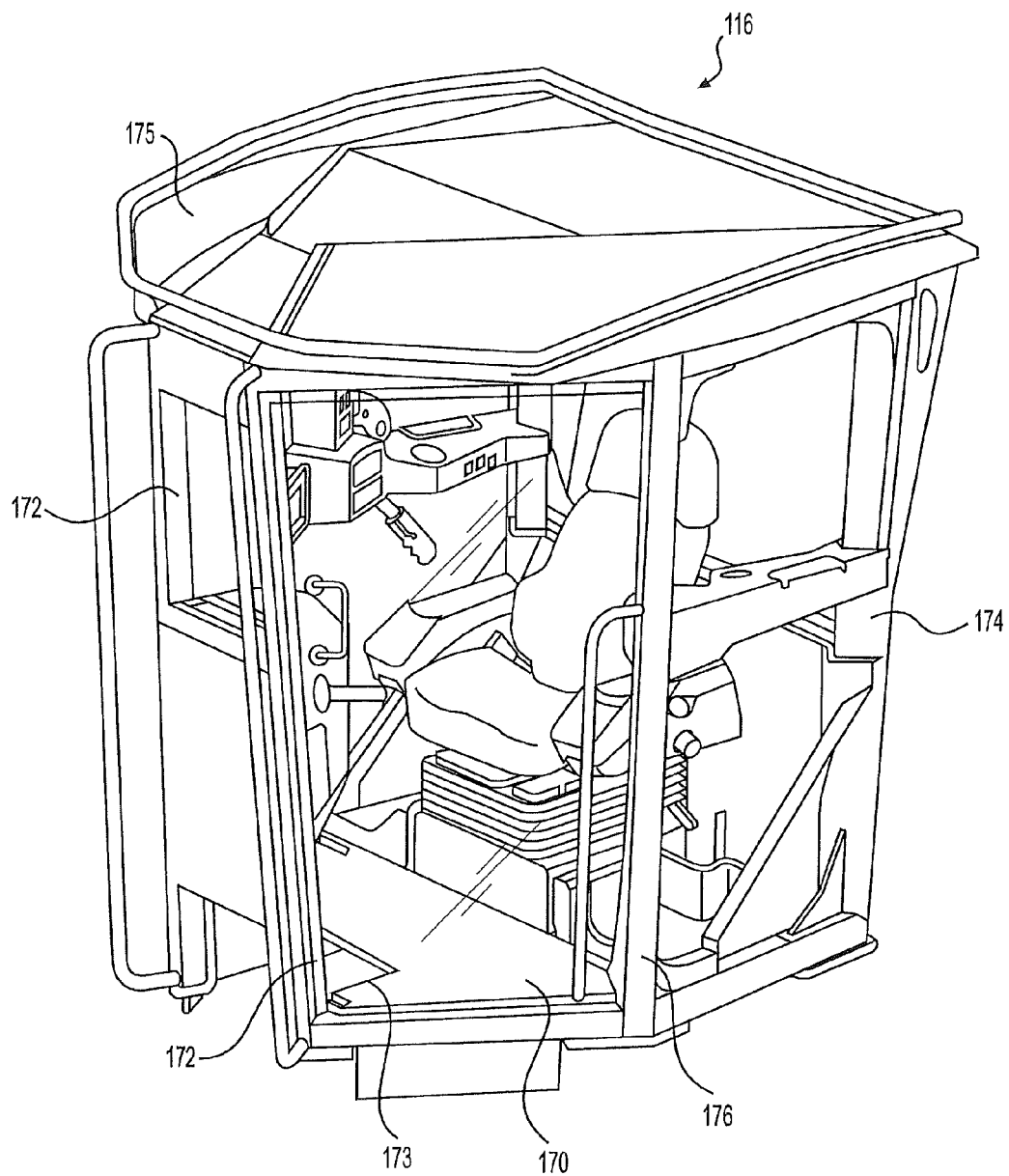
FIG. 3 is a perspective view of a narrow front operator cab.
Figure 4:
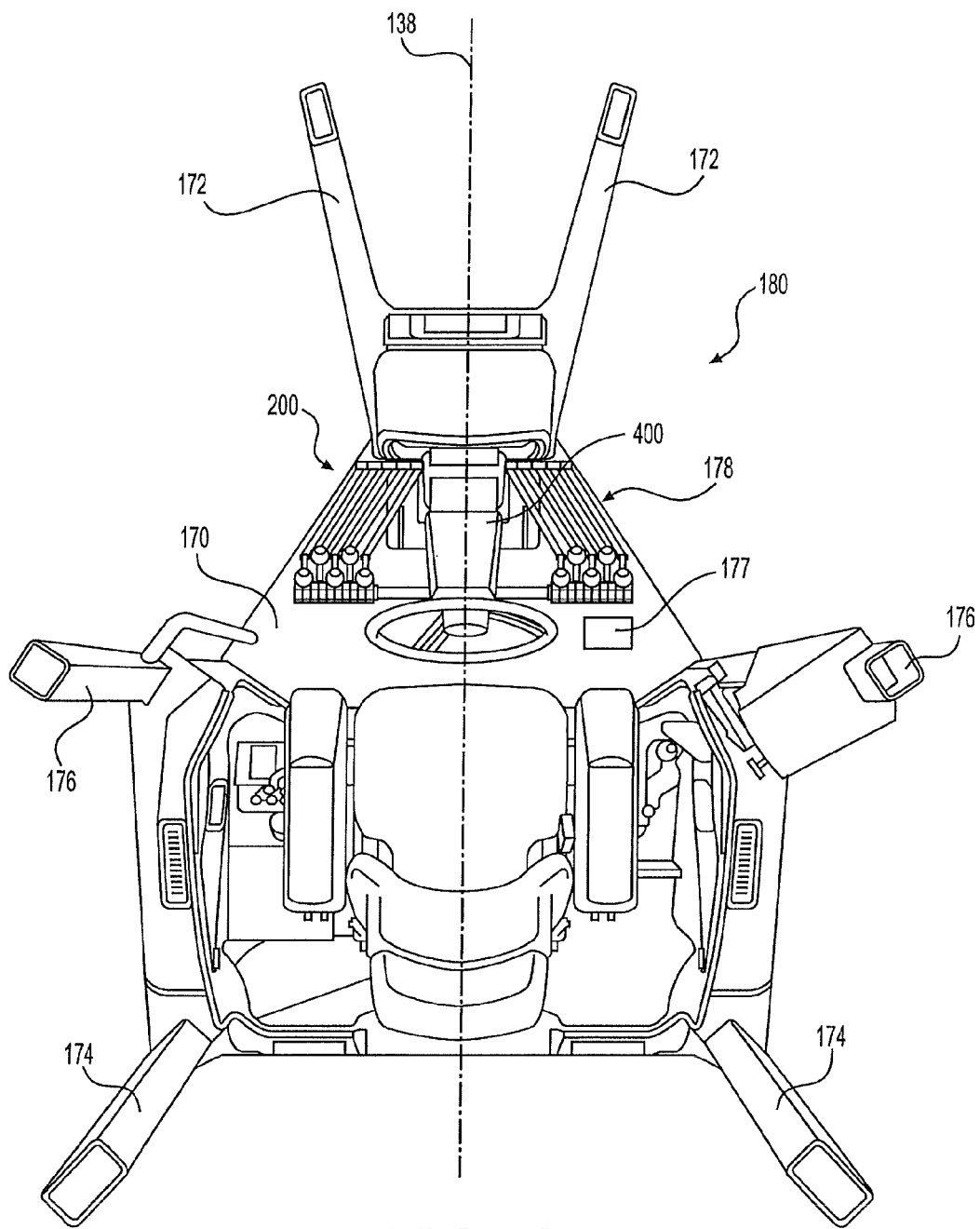
FIG. 4 is a partial top interior view of a narrow front cab showing a main implement valve layout of the disclosure.

Turning to FIGS. 3 and 4, the operator cab 116 may include a floor 170, a roof 175, front vertical support bars 172, rear corner vertical support bars 174, and side support bars 176. The floor 170, the roof 175, the front vertical support bars 172, the rear corner vertical support bars 174, and the side support bars 176 may form, at least in part, a cab frame of the operator cab 116. A width between the front vertical support bars 172 may be narrower than a width of the side support bars 176, thereby allowing edges 178 of the floor 170 of the operator cab 116 to taper inwards toward each other when traced from the side support bars 176 toward the front vertical support bars 172. In other words, a width of the floor 170 may be narrower towards a front of the operator cab 116.

In one aspect, the front vertical support bars 172 and side support bars 176, together with the edges 178 and the roof 175, may form a door structure or a window opening. The door structure or window opening, may each include a transparent panel to enable an operator to see outside of the operator cab 116 while isolating external elements such as noise, weather, and debris from the operator cab 116. In one aspect, the edges 178 may be angled inwards 20-50 degrees with respect to a plane of the floor 170. In select aspects, the edges 178 may be angled 30 degrees. The inward taper of the operator cab 116 may form a narrow front end 180 of operator cab 116, but increases a length at the edges 178, thereby creating a larger visual opening for an operator to look out of and improving line of sight to the front wheels 118 and/or the blade 120.

While the narrow front end 180 of the operator cab 116 improves outward visibility to the worksite and components of the machine 100, such as the front wheels 118 and the blade 120, the narrow front end 180 provides less width than square configuration cabs, and therefore space for controls is more limited.

As shown in FIGS. 4-9, a main implement control system 200 may provide a compact arrangement for mounting and actuating implement valve controls in the narrow front end 180 of the operator cab 116 without affecting adjustability of the controls or provide large obstructions to visibility via visual openings between the front vertical support bars 172 and side support bars 176. The main implement control system 200 may include implement control levers 210 connected to a hydraulic valve block 300 for actuating different hydraulic control valves to create and adjust various functions, such as but not limited to, wheel lean of the front wheels 118, articulation of the front frame 112, a position of the blade 120, etc. The control levers 210 may be rotatably supported on a control support shaft 220, and the control support shaft 220 may be mounted to a support column, such as a steering column 400. The control support shaft 220 may be a single shaft extending through the steering column 400 to support both a first set 212 of control levers 210 and a second set 214 of control levers 210. Alternatively, the control support shaft 220 may include two or more segments that are mounted on or through the steering column 400 to support the first set 212 of control levers 210 and the second set 214 of control levers 210.

The steering column 400 may rotatably support a steering wheel 405, which may be used to steer and/or control a direction of machine 100. The steering column 400 may include an upper bracket 410 located near an upper portion of the steering column 400 and may include a first pivot point 412 and a second pivot point 414. The upper bracket 410 may be attached to a base or lower portion of the steering column 400 via an upper steering support portion 430 and the first pivot point 412. The upper steering support portion 430 may be secured to a base 450 of the steering column 400 via a first pivot point 416 of the steering column 400. The upper bracket 410 may be attached to the base 450 of the steering column 400 via a lower steering support portion 440 and the first pivot point 416. The lower steering support portion 440 may be secured to the base 450 of the steering column 400 via a second pivot point 418 of the steering column 400.

Figure 7:
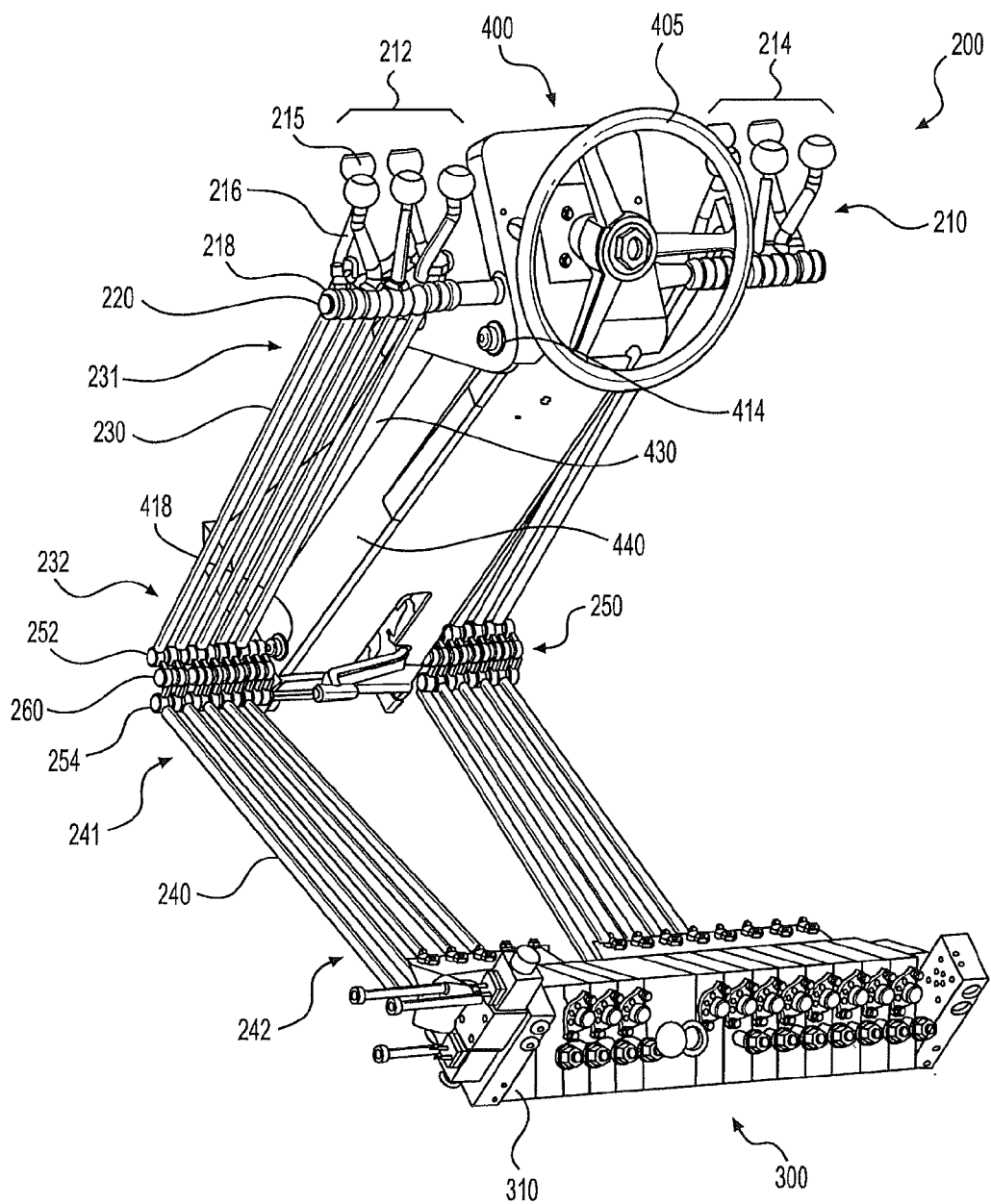
FIG. 7 is a perspective view of the main implement valve layout for a narrow front operator cab.
Figure 8:
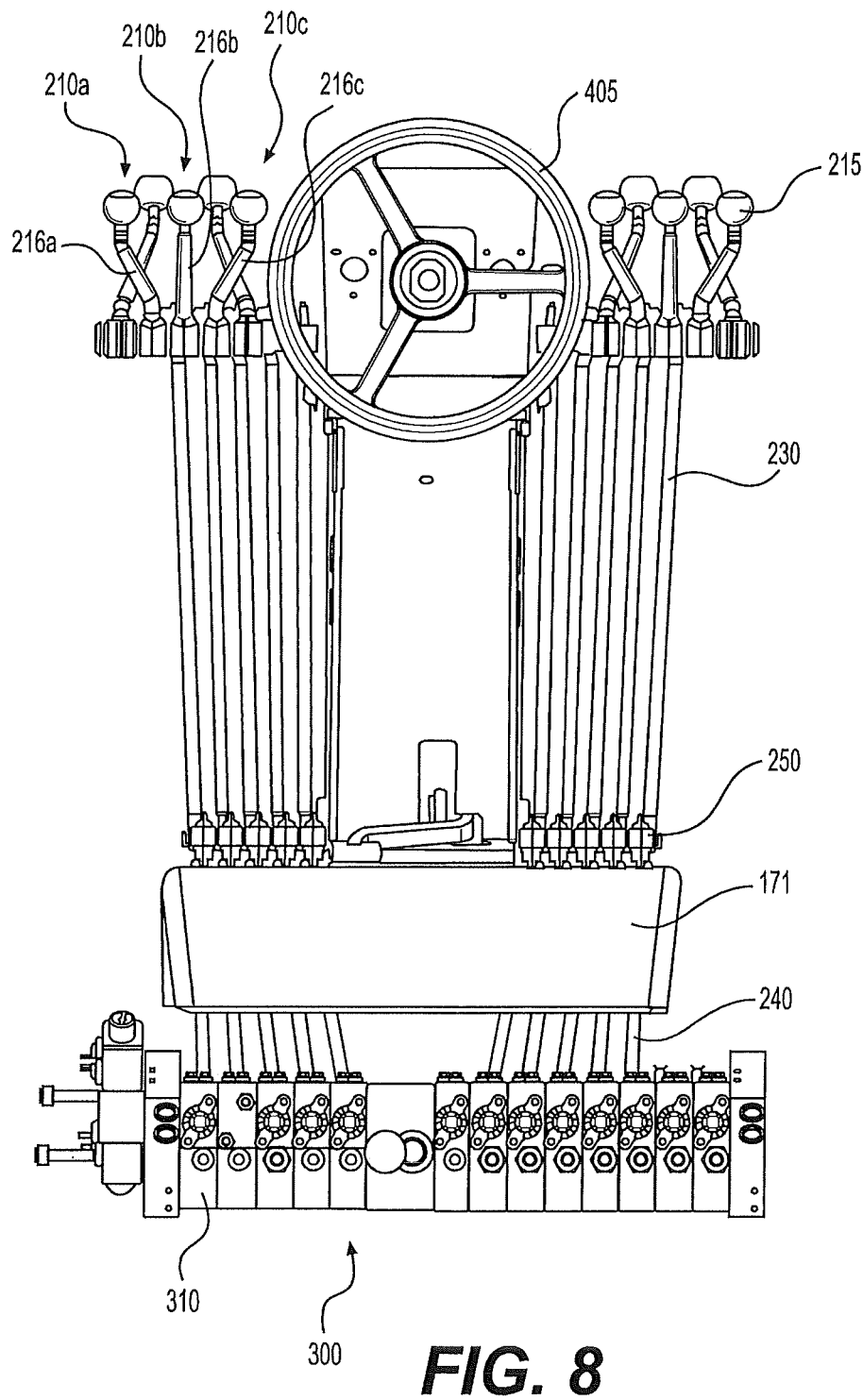
FIG. 8 is a front view of the main implement valve layout of FIG. 7.

The upper steering support 430 and the lower steering support 440, together with the pivot points 412, 414, 422, 424, enable the steering column 400 to rotate forwards or backwards with respect to a longitudinal direction of the operator cab 116. In one aspect, the upper steering support 430 and the lower steering support 440, together with the pivot points 412, 414, 422, 424, may form an adjustable parallelogram structure. Since the steering column 400 may be rotated forwards or backwards, a fore and aft position of the steering wheel 405 and the control levers 210 may be adjusted. In one aspect, the hydraulic control valves of the hydraulic valve block 300 may be stacked laterally in a direction perpendicular to the longitudinal axis 138 and/or the longitudinal direction of the operator cab 116, as shown in FIGS. 7 and 8. Additionally, or alternatively, a height of the steering wheel 405 and the control levers 210 may be adjusted to improve reach and comfort for an operator.

Each of the control levers 210 may be connected to the hydraulic valve block 300 via at least a first linkage 230, a second linkage 240, and a bell crank 250. The first linkage 230 may extend, from the control levers 210, downwardly towards the narrow front end 180 of the operator cab 116 to connect with a first portion 252 of the bell crank 250. The second linkage 240 may extend, from a second portion 254 of the bell crank 250, downwardly away from the narrow front end 180 of the operator cab 116 to connect with a hydraulic control valve of the hydraulic valve block 300. In one aspect, the first linkage 230 may be a straight rod. In one aspect, the second linkage 240 may be a straight rod.

Figure 6:
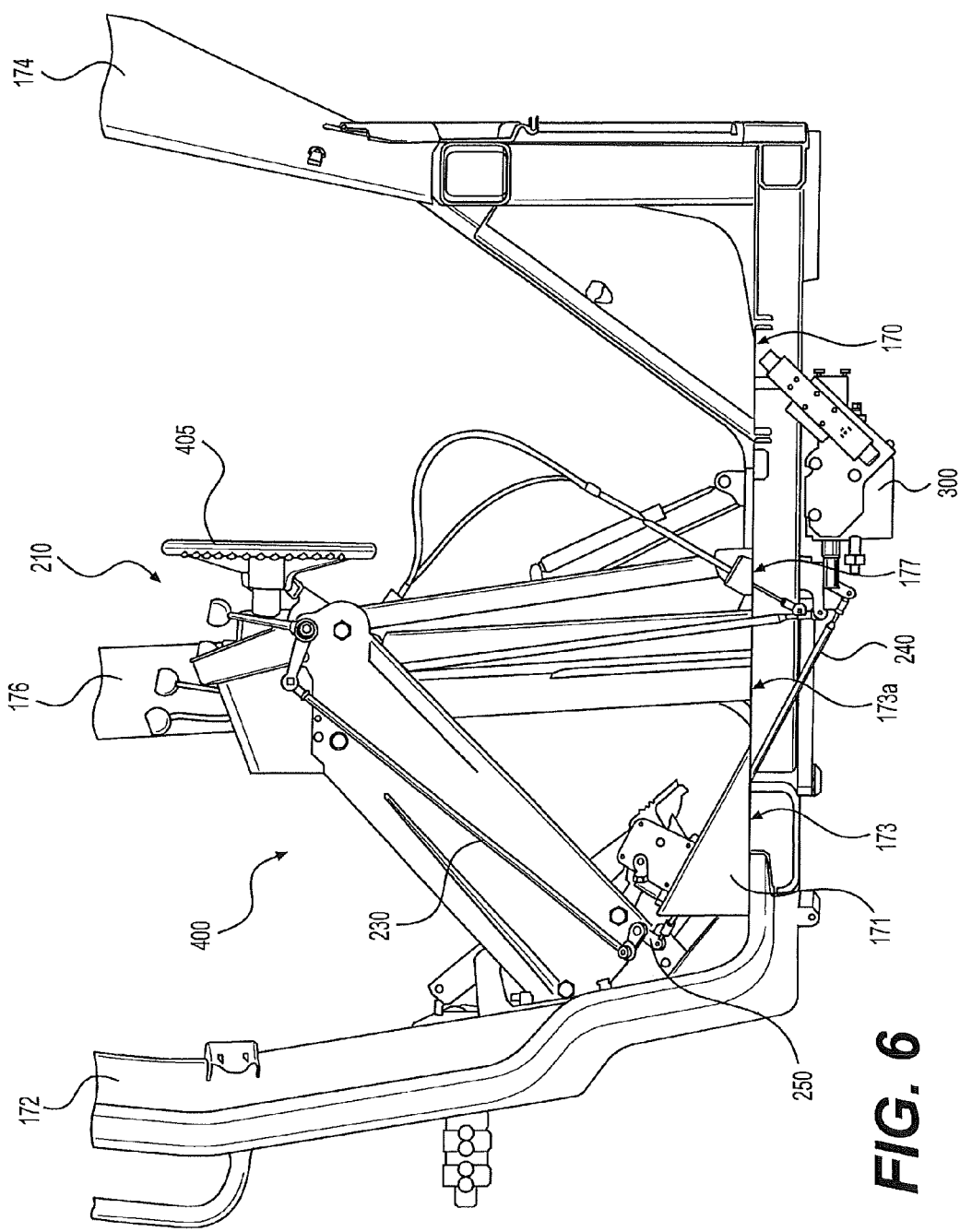
FIG. 6 is a partial side interior view of the narrow front operator cab showing the main implement valve layout of FIG. 4.

In one aspect, as shown in FIG. 6, the hydraulic valve block 300 may be mounted below the floor 170 of the operator cab 116. The second linkage 240 may extend through a cutout or opening 173 of the floor 170 to connect to the hydraulic valve block 300 below the floor 170. By moving the hydraulic valve block 300 to a location below the floor 170 of the operator cab 116, the hydraulic valve block 300 can be located away from the steering column 400, thus removing bulk and obstruction in front of and/or around the base 450 of the steering column 400. By reducing the bulk and obstruction, improved visibility of the narrow front end 180 of the operator cab 116 is maintained. Additionally, by moving the hydraulic valve block 300 below the floor 170 of the operator cab 116, accessibility to the hydraulic valve block 300 may be improved. For example, an access panel 190 may be provided over an access opening 173a in the floor 170 directly above the hydraulic valve block 300 for improved access to conduct service, maintenance, and/or repair operations, for example.

Figure 5:
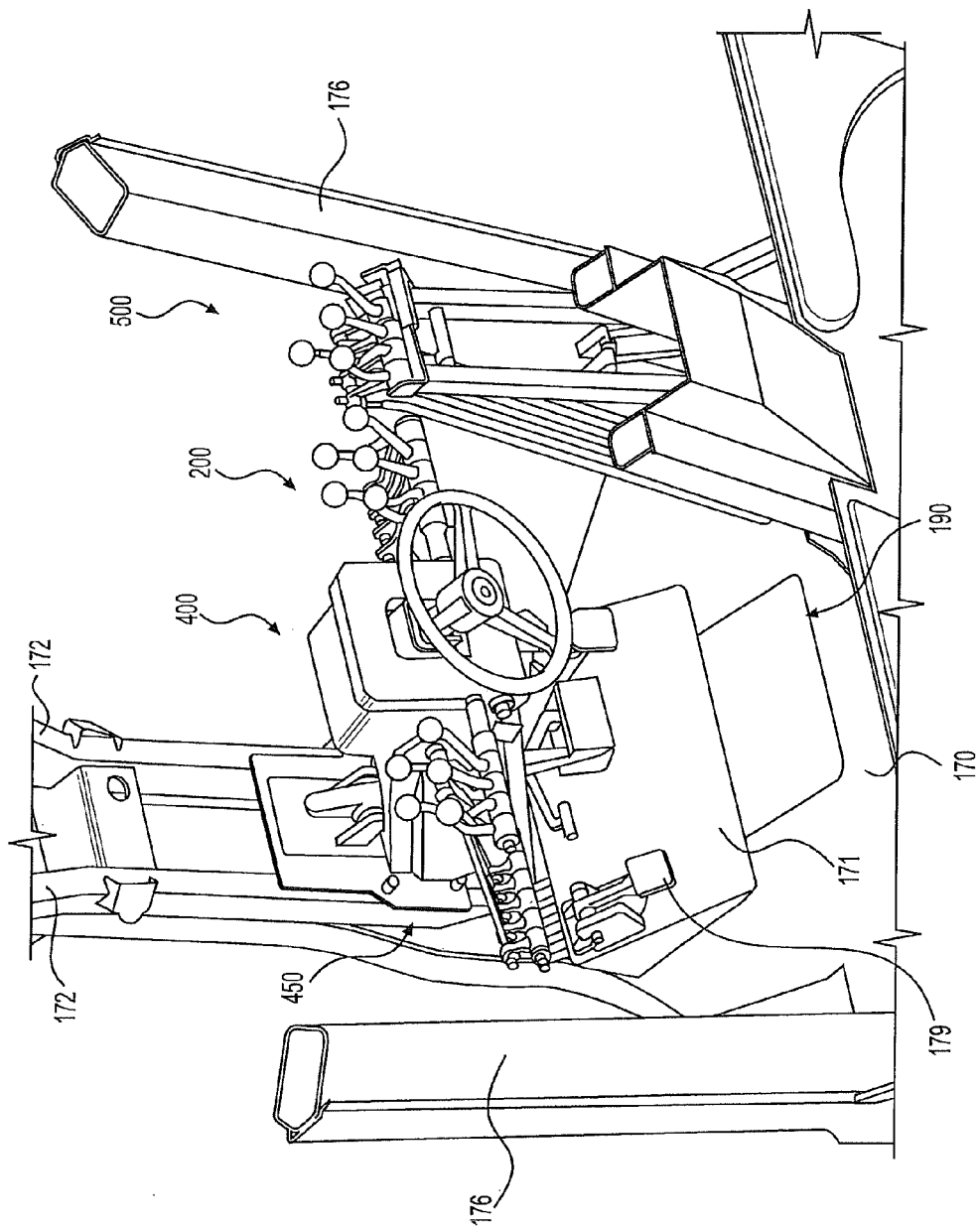
FIG. 5 is a partial perspective interior view of the narrow front operator cab showing the main implement valve layout of FIG. 4.

In one aspect, as shown in FIGS. 5 and 6, the cutout or opening 173 of the floor 170 may be provided with a cover 171 to at least partially close the opening 173 while allowing the second linkage 240 to pass downwardly through the floor 170. In one aspect, the cover 171 may have a triangular profile with a slope approximately the same as a slope of the second linkage 240 extending from the bell crank 250 to the hydraulic valve block 300. The cover 171 may provide a barrier between actuating components of the main implement control system 200, such as the second linkage 240, and may isolate an interior of the operator cab 116. The cover 171 may be disassembled and removed from the floor 170 via fasteners and/or latches to allow access to the main implement control system 200 for service, maintenance, and/or repair. In one aspect, the cover 171 may serve as a foot rest for the operator during a seated position. In one aspect, the cover 171 may serve as a platform for mounting one or more pedal actuators 179 to control the machine 100, such as braking or acceleration of the machine 100.

Turning to FIGS. 7 and 8, the main implement control system 200 may include the first set 212 of the control levers 210 that is mounted to a left side of the steering column 400. The main implement control system 200 may additionally, or alternatively, include the second set 214 of the control levers 210 that is mounted to a left right of the steering column 400. Each of the control levers 210 may include a knob or handle 215, a first arm 216, and a second arm 217.

In one aspect, the first set 212 and the second set 214 of the control levers 210 may be used to control and/or adjust one or more of a snow wing lift, a snow wing tilt, a ripper, a first blade lift, a blade sideshift, a blade circle, a blade tip, an articulation, a centershift, a wheel lean, a second blade lift, a dozer lift, a dozer angle, and a post factory accessory. In select aspects, the control levers 210 of the first set 212 and the second set 214 may be arranged in the following order from left to right to be associated with the following control functions: a snow wing lift, a snow wing tilt, a ripper, a first blade lift, a blade sideshift, a blade circle, a blade tip, an articulation, a centershift, a wheel lean, a second blade lift, a dozer lift, and a dozer angle. In select aspects, the first set 212 and the second set 214 of the control levers 210 together may include up to fourteen control levers 210. In select aspects, the first set 212 and the second set 214 of the control levers 210 together may include ten total control levers 210.

In select aspects, one of the first set 212 and the second set 214 of the control levers 210 may include up to four control levers 210, while the other of the first set 212 and the second set 214 of the control levers 210 may include up to three control levers 210. In select aspects, the first set 212 and the second set 214 may include a maximum of seven control levers 210 when an auxiliary implement control is also used, as will be described in further detail below.

In one aspect, the first set 212 and the second set 214 of control levers 210 may be arranged such that the handle 215 of the adjacent control levers 210 may be staggered with respect to a front to back direction of the operator cab 116. By staggering the control levers 210, an overall width of the control support shaft 220 supporting the control levers 210 may be reduced. In one aspect, the control levers 210 may be selected from a group of control levers 210*a*, 210*b*, 210*c* with differently configured first arms 216*a*, 216*b*, 216*c*. In one aspect, as shown in FIG. 8, the control lever 210*a* may include a first arm 216*a* which extends at an angle to the left. In one aspect, the control lever 210*b* may include a first atm 216*b* which extends vertically without an angle. In one aspect, the control lever 210*c* may include a first arm 216*c* which extends at an angle to the right. By pairing different control levers 210*a*, 210*b*, 210*c*, a staggered arrangement of the control levers 210 may be obtained to further reduced the overall width of the control support shaft 220. In select aspects, two or more of the same type of control levers 210*a*, 210*b*, 210*c*, may be selected and arranged adjacent to each other in order to allow for an operator to grab and actuate the two or more of the same type of control levers 210*a*, 210*b*, 210*c* simultaneous for certain operations.

Figure 9:
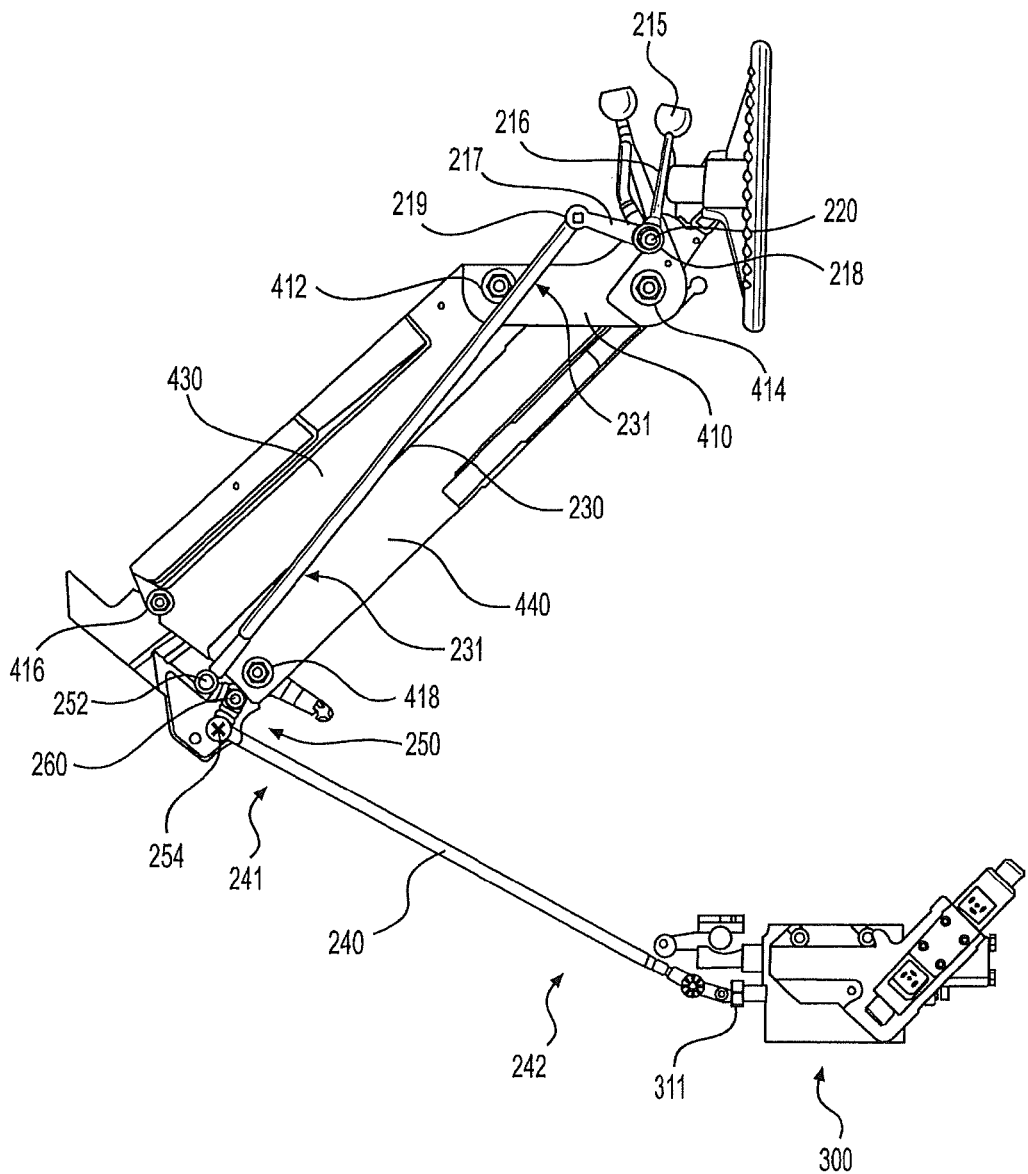
FIG. 9 is a side view of the main implement valve layout of FIG. 7.

Referring to FIGS. 6 and 9, the control lever 210 is shown with the handle 215, the first arm 216, and the second arm 217. The handle 215 may be attached to an end of the first arm 216. The first arm 216 may extend upwardly with respect to the control support shaft 220, and the second arm 217 may extend forwardly with respect to the control support shaft 220 in a front to back direction of the operator cab 116. The control lever 210 may include a cylindrical mount 218 which may be rotatably mounted over the control support shaft 220. In select aspects, the first arm 216 and the second arm 217 may extend from the cylindrical mount 218 to form an L-shaped arrangement. In operation, each of the control levers 210 may be rotated about an axis of the control support shaft 220 to actuate a respective hydraulic control valve 310 of the hydraulic valve block 300 to control various aspects of the machine 100, as will be described in more detail below.

Referring to FIGS. 6-9, the bell crank 250 may be provided for each of the control levers 210. The bell crank 250 may be mounted near a base of the steering column 400 via one or more bell crank support shafts 260. In one aspect, a single bell crank support shaft 260 may extend through the steering column 400 to support bell cranks 250 associated with both the first set 212 of control levers 210 and the second set 214 of control levers 210. Alternatively, the bell crank support shaft 260 may include two or more segments that are mounted on or through the steering column 400 to support bell cranks 250 associated with one of the first set 212 of control levers 210 and the second set 214 of control levers 210.

In one aspect, the bell crank 250 may include a first portion 252, a second portion 254, and a mounting bracket 253. The mounting bracket 253 may include an inner cylindrical surface to rotatably mount the bell crank 250 onto the bell crank support shaft 260. In one aspect the first portion 252 may extend forwardly with respect to the bell crank support shaft 260, and the second portion 254 may extend downwardly with respect to the bell crank support shaft 260 in a front to back direction of the operator cab 116. In select aspects, the first arm 216 and the second arm 217 may each extend from the cylindrical mount 218 to form an L-shaped arrangement.

In one aspect, as shown in FIGS. 7-9, the control lever 210 may include a joint 219, and the joint 219 may be coupled to an upper end 231 of the first linkage 230. A lower end 232 of the first linkage 230 may be connected to the first portion 252 of the bell crank 250. In one aspect, a width of the bell crank support shaft 260 may be narrower than a width of the control support shaft 220. In one aspect, the first linkage 230 may extend downwardly towards a center of the steering column 400 from the upper end 231 to the lower end 232, thereby reducing an overall width of the main implement control system 200 and improving space for ingress and egress for an operator.

In one aspect, the second portion 254 may be coupled to a forward end 241 of the second linkage 240. A rear end 242 of the second linkage 240 may be coupled to a hydraulic control valve 310 of the hydraulic valve block 300. In one aspect, the rear end 242 of the second linkage 240 may be coupled to an actuator 311 of the hydraulic control valve 310.

In one aspect, during operation of the control lever 210, the handle 215 may be rotated in a forward direction with respect to a forward direction of the operator cab 116. The control lever 210, including the first arm 216, the second arm 217, cylindrical mount 218, and the joint 219 may be rotated in a counter-clockwise direction with respect to the control support shaft 220. The first linkage 230 may in turn be moved in a downwardly and/or forwardly direction to apply a downward force on the first portion 252 of the bell crank 250. The downward force on the first portion 252 of the bell crank 250 may in turn cause the bell crank 250 to rotate in a counter-clockwise direction with respect to the bell crank support shaft 260. The rotation of the bell crank 250 may apply a rearward force to move the second linkage 240 in a downwardly and/or rearwardly direction to actuate the actuator 311 of the hydraulic control valve 310 towards a first operating position.

In one aspect, during operation of the control lever 210, the handle 215 may be rotated in a rearward direction with respect to a rearward direction of the operator cab 116. The control lever 210, including the first arm 216, the second arm 217, cylindrical mount 218, and the joint 219 may be rotated in a clockwise direction with respect to the control support shaft 220. The first linkage 230 may in turn be moved in an upwardly and/or rearwardly direction to apply an upward force on the first portion 252 of the bell crank 250. The upward force on the first portion 252 of the bell crank 250 may in turn cause the bell crank 250 to rotate in a clockwise direction with respect to the bell crank support shaft 260. The rotation of the bell crank 250 may apply a forward force to move the second linkage 240 in an upwardly and/or forwardly direction to actuate the actuator 311 of the hydraulic control valve 310 towards a second operating position.

As discussed above, the main implement control system 200 may include a maximum of ten total control levers 210. The main implement control system 200 including up to a total of ten control levers 210 that may be installed direct from a factory manufacturing the machines 100. In some instances, the machine 100 may later be retrofitted or upgraded with additional equipment during its lifetime and additional controls may be necessary to control the additional features and/or equipment. Due to the layout of the narrow front end 180 of the operator cab 116, an auxiliary implement control layout may be added to provide additional controls while maintaining outward visibility for the operator, as will be described in further detail below.

Figure 10:
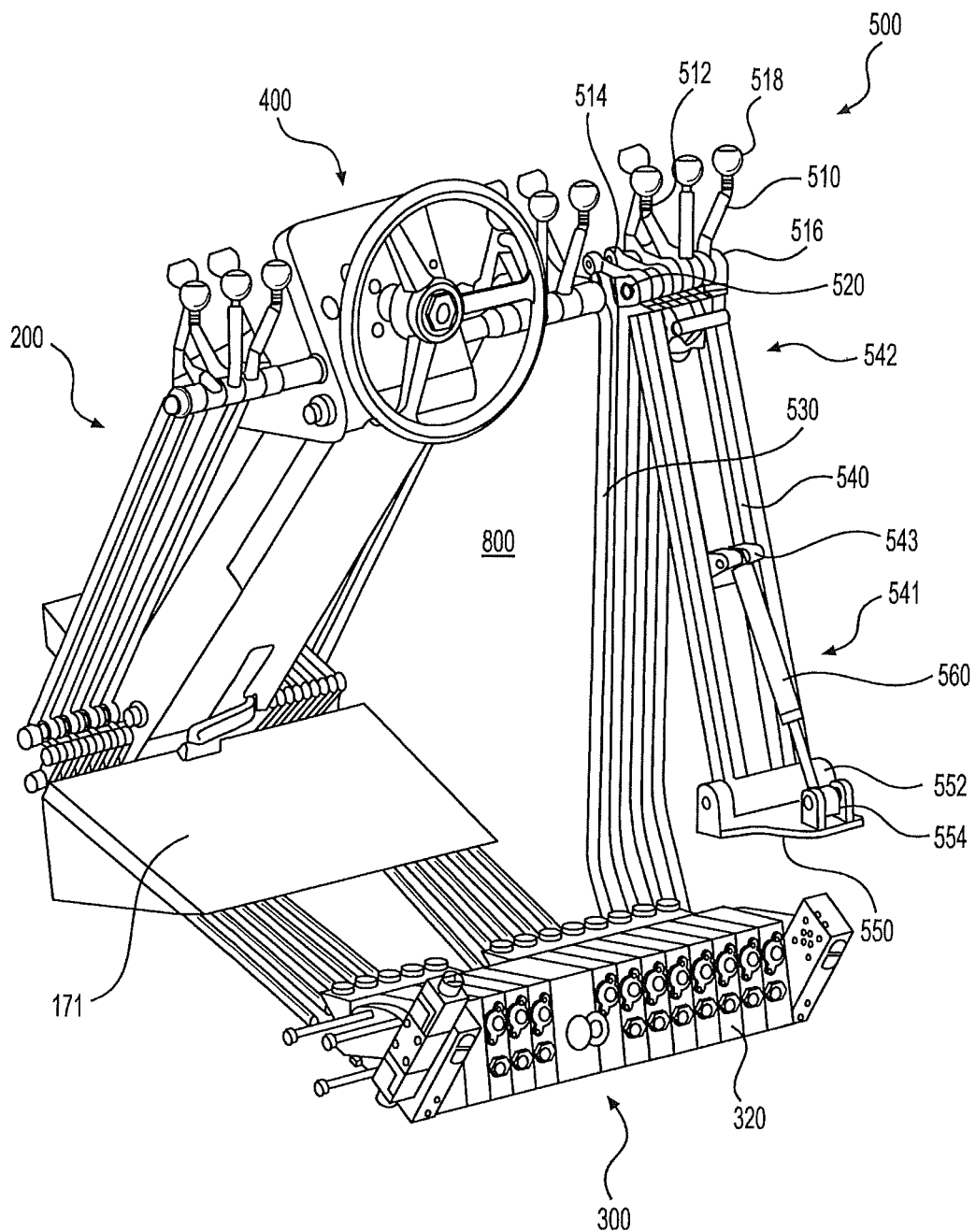
FIG. 10 is a perspective view of the main implement valve layout for narrow front operator cab with a first exemplary auxiliary implement control layout.
Figure 11:
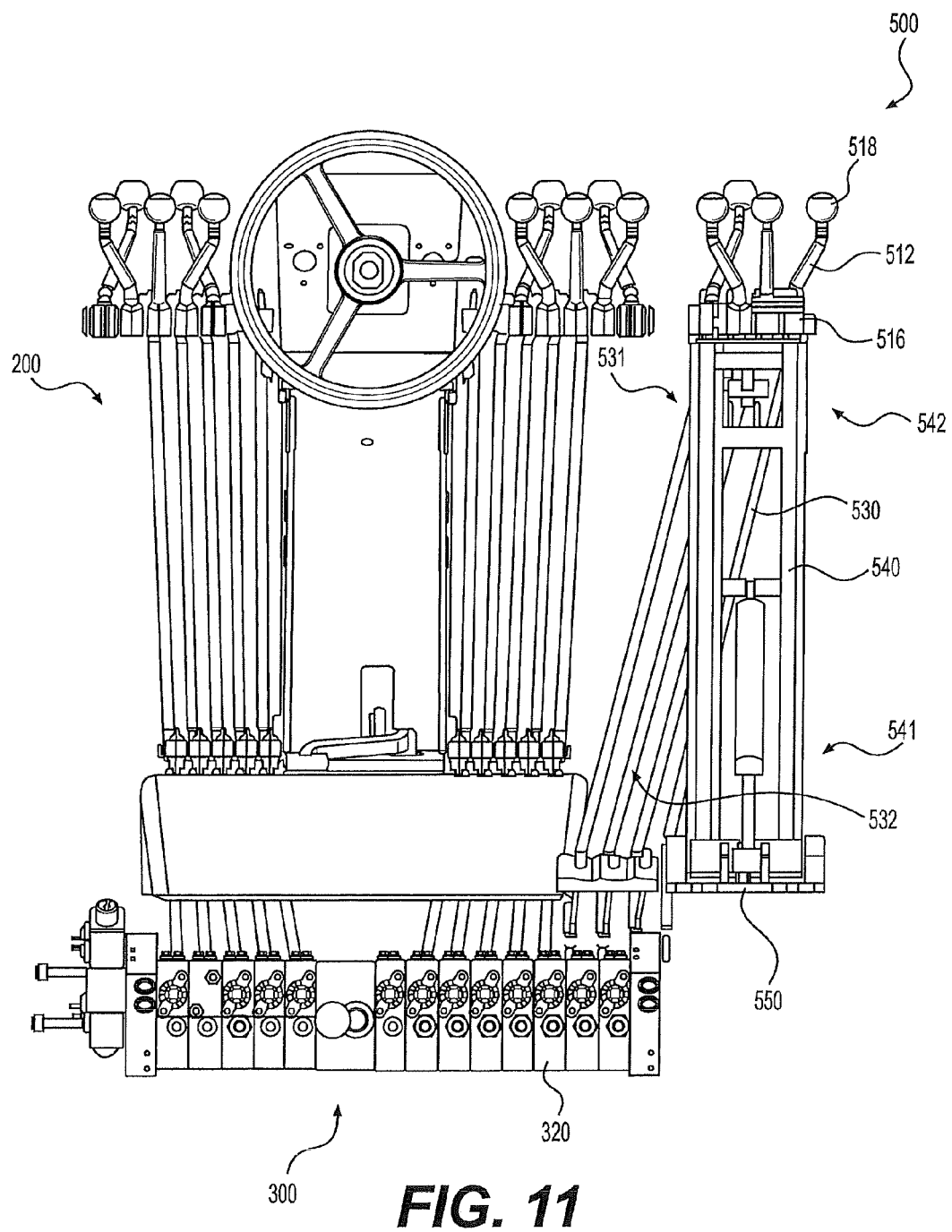
FIG. 11 is a front view of the main and auxiliary implement valve layout and hydraulic block of FIG. 10.
Figure 12:
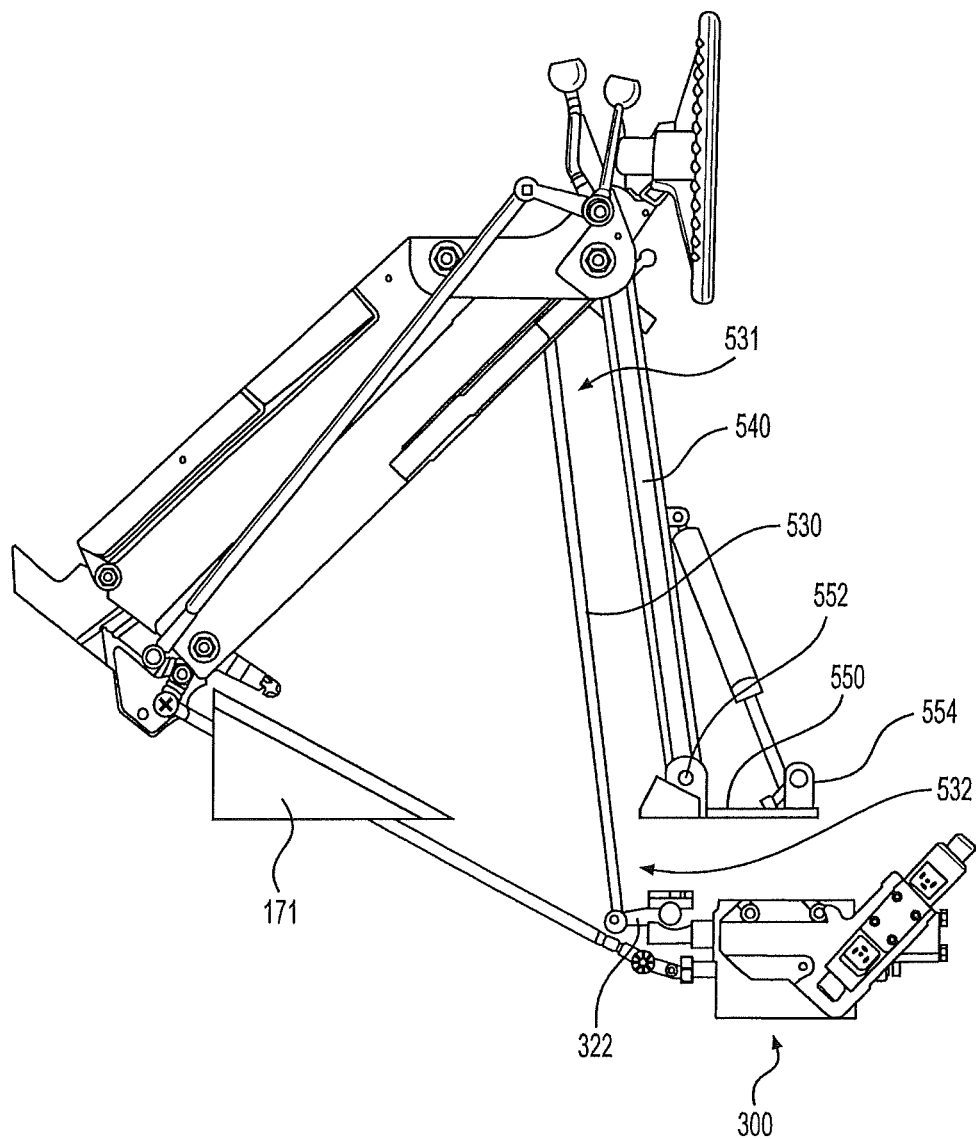
FIG. 12 is a side view of the main and auxiliary implement valve layout and hydraulic block of FIG. 10.

Referring to FIGS. 10-12, a first exemplary auxiliary implement control layout 500 will now be discussed. The auxiliary implement control layout 500 may be installed within the operator cab 116. In one aspect the auxiliary implement control layout 500 may be installed on a side opposite from a door or entryway of the operator cab 116. In one aspect, a mounting location of the auxiliary implement control layout 500 may be laterally offset from the longitudinal axis 138 of the operator cab 116 In one aspect, the auxiliary implement control layout 500 may include at least one auxiliary control lever 510, an auxiliary control support shaft 520, at least one actuation member such as an auxiliary linkage 530, a support frame 540, and a base 550. In one aspect, the base 550 may be secured to the floor 170 of the operator cab 116. The base 550 may include a first bracket 552 for pivotably supporting a first end 541 of support frame 540. The auxiliary control support shaft 520 may be secured to a second end 542 of the support frame 540. The at least one auxiliary control lever 510 may be rotatably mounted to the auxiliary control support shaft 520. In one aspect, the auxiliary linkage may be a connection rod or a connection shaft, which may be solid or hollow. In one aspect, the support frame 540 and the base 550 may be a single structure.

A fixed arm or an adjustable strut 560 may be secured between a central portion 543 of the support frame 540 and a second bracket 554 of the base 550 to set an upright position of the support frame 540. In select aspects, a position of the auxiliary implement control layout 500 may be adjusted by adjusting a length of the adjustable strut 560. For example, a length of the adjustable strut 560 may be reduced to rotate the support frame 540 rearward with respect to a rear of the operator cab 116 in order to bring the at least one auxiliary control lever 510 closer to an operator. Conversely, a length of the adjustable strut 560 may be increased to rotate the support frame 540 forward with respect to a front of the operator cab 116 in order to move the at least one auxiliary control lever 510 away from an operator. In one aspect, the adjustable strut 560 may be a pneumatic strut. The adjustability of the support frame 540 may improve reach and ergonomics of the at least one auxiliary control lever for an operator.

In one aspect, the auxiliary implement control layout 500 may include a plurality of auxiliary control levers 510. In one aspect, each of the plurality of auxiliary control levers 510 is provided with a respective auxiliary linkage 530. In one aspect, the auxiliary implement control layout 500 may include up to four auxiliary control levers 510, and up to four corresponding auxiliary linkages 530. In one aspect, the auxiliary implement control layout 500 may be paired with the first set 212 and the second set 214 of the control levers 210, which may also be referred to as the main control levers. In one aspect, a first lateral distance between the at least one main control lever 210 and the longitudinal axis 138 is less than a second lateral distance between the at least one auxiliary control lever 510 and the longitudinal axis 138. In select aspects, the first set 212 and the second set 214 of the control levers 210 may each include five control levers 210, and the auxiliary implement control layout 500 may include up to four auxiliary control levers 510. In select aspects, the auxiliary implement control layout 500 may include four auxiliary control levers 510 to control and/or adjust one or more of a blade lift, a blade angle, a wing lift, and a wing tilt.

Each of the auxiliary control levers 510 may include the first arm 512, the second arm 514, and the cylindrical mount 516. The cylindrical mount 516 of each of the auxiliary control levers 510 may be rotatably mounted onto an exterior of the auxiliary control support shaft 520. The first arm 512 may be attached to a knob or handle 518. The second arm 514 may be attached to an upper end 531 of the auxiliary linkage 530. A lower end 532 of the auxiliary linkage 530 may be attached to a hydraulic control valve 320 of the hydraulic valve block 300. In operation, each of the control levers 510 may be rotated about an axis of the auxiliary control support shaft 520 to actuate a respective hydraulic control valve 320 of the hydraulic valve block 300 to control the operation or function of equipment installed on the machine 100. In one aspect, the at least one auxiliary control lever 510 may be rotated forward, with respect to a forward direction of the operator cab 116. The second arm 514 may cause the auxiliary linkage 530 to move downwardly to actuate the control valve 320 of the hydraulic valve block 300. In one aspect, the second arm 514 may cause the auxiliary linkage 530 to push downwardly on an actuator 322 of the control valve 320. In one aspect, the at least one auxiliary control lever 510 may be rotated rearward, with respect to a forward direction of the operator cab 116. The second arm 514 may cause the auxiliary linkage 530 to move upward to actuate the control valve 320 of the hydraulic valve block 300. In one aspect, the second arm 514 may cause the auxiliary linkage 530 to pull upward on the actuator 322 of the control valve 320.

In one aspect, the floor 170 may include a second opening 177 (as shown in FIGS. 4 and 6) separate from the opening 173, to allow the auxiliary linkage 530 to pass through a plane of the floor 170 to connect to the hydraulic valve block 300 located below the floor 170. The second opening 177 may be located forward of the base 550 with respect to a forward direction of the operator cab 116. By locating and supporting the auxiliary implement control layout 500 separately from the main implement control system 200, a visual opening 800 may be provided therebetween to improve visibility out of the operator cab 116, as shown in FIG. 10.

Figure 13:
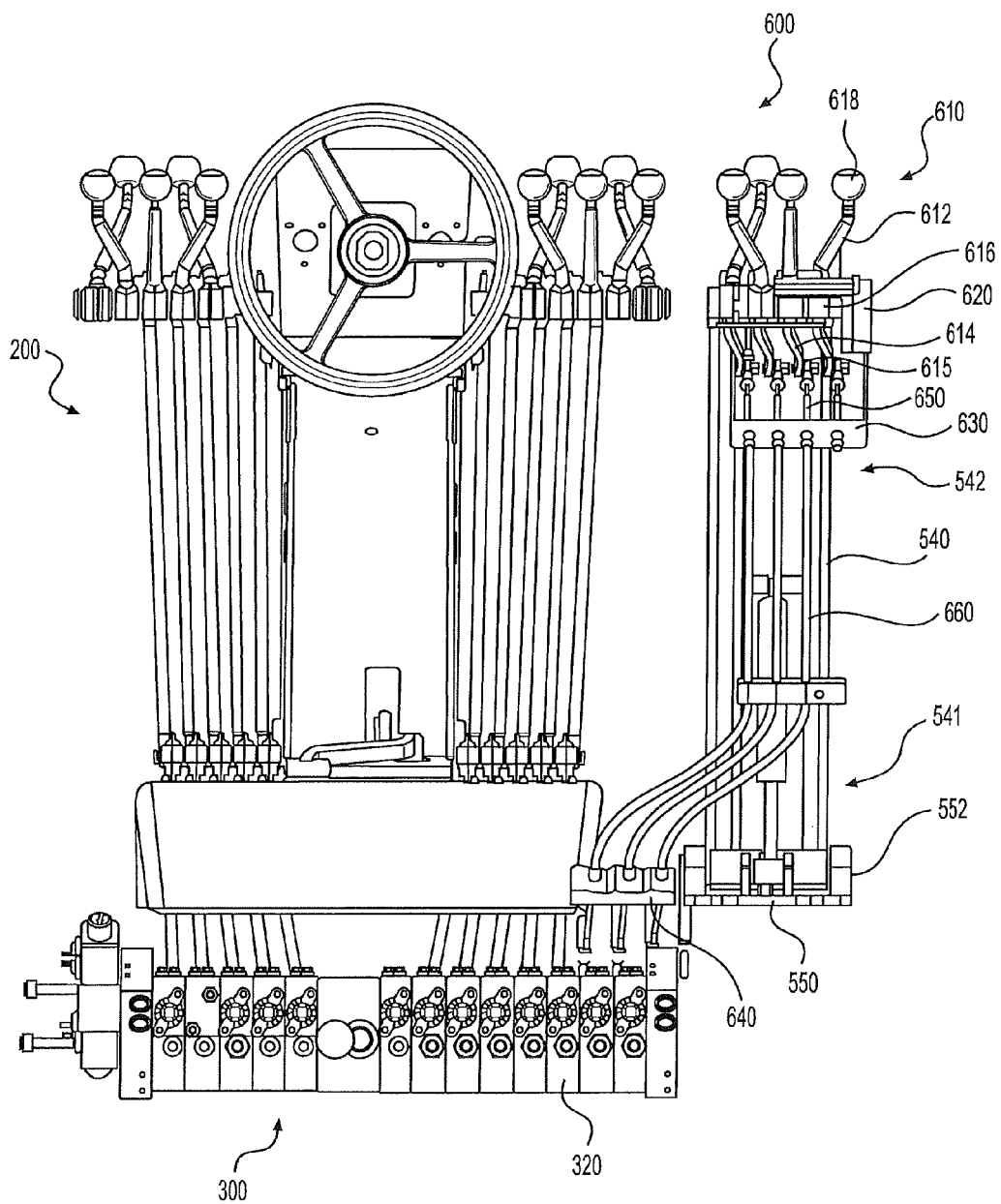
FIG. 13 is a front view of the main implement valve layout and narrow front operator cab with a second exemplary auxiliary implement control layout.
Figure 14:
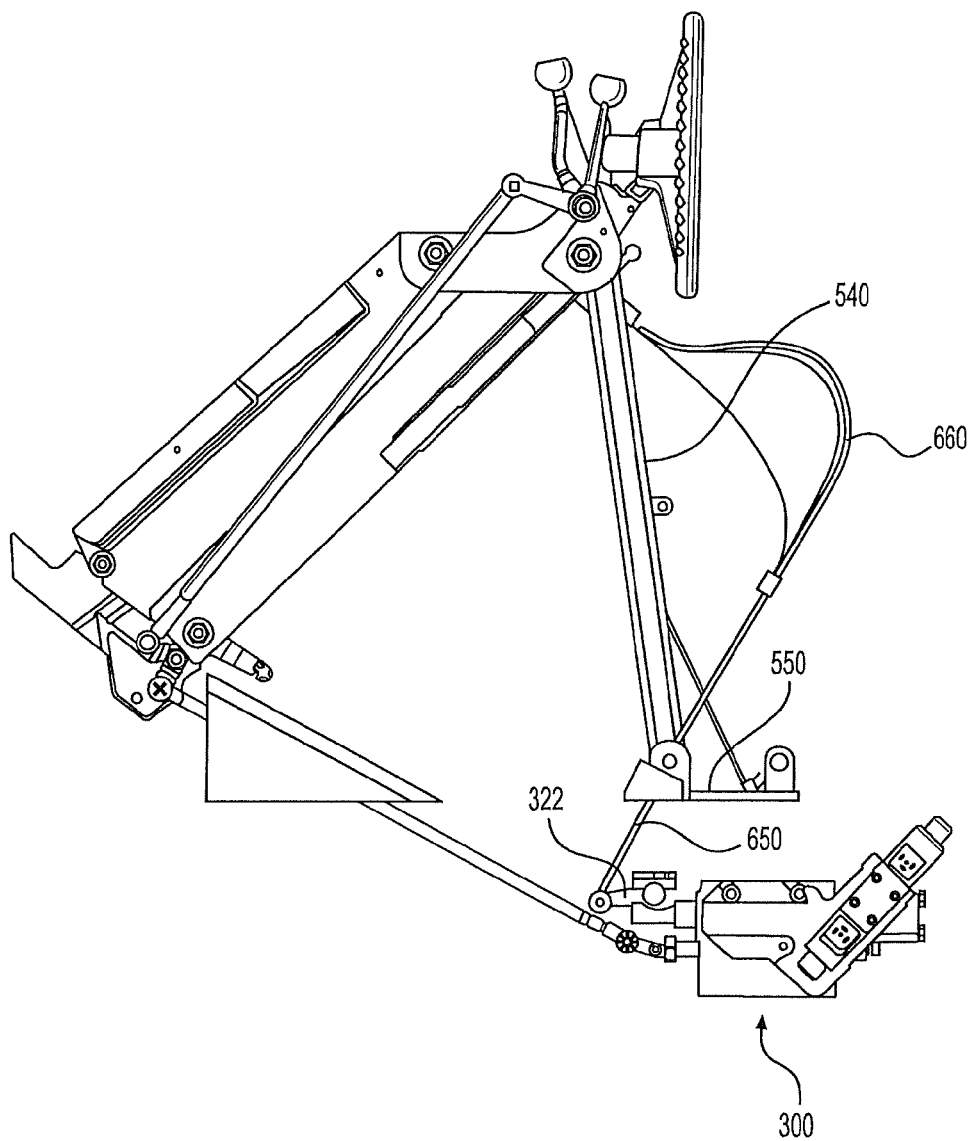
FIG. 14 is a side view of the main and auxiliary implement valve layout of FIG. 13.

Referring to FIGS. 13 and 14, a second exemplary auxiliary implement control layout 600 will now be discussed. The second exemplary auxiliary implement control layout 600 may include mounting structure similar to that of the first exemplary auxiliary implement control layout 500, as discussed above. For example, the second exemplary auxiliary implement control layout 600 may include a support frame 540 and a base 550. In one aspect, the base 550 may be secured to the floor 170 of the operator cab 116. The base 550 may include a first bracket 552 for rotatably supporting a first end 541 of support frame 540.

The second exemplary auxiliary implement control layout 600 may include at least one auxiliary control lever 610, an auxiliary control support shaft 620, a cable actuation bracket 630, a cable actuation mount 640, an actuation member such as a cable 650, and a cable housing 660. The at least one auxiliary control lever 610 may be rotatably supported on the auxiliary control support shaft 620. The auxiliary control support shaft 620 and the cable actuation bracket 630 may be secured to a second end 542 of the support frame 540. In one aspect, the cable actuation mount 640 may be mounted to the floor 170 of the operator cab 116. In one aspect, the cable actuation mount 640 may be mounted to the floor 170 above the hydraulic valve block 300. In one aspect, the cable actuation mount 640 may be mounted over the second opening 177 on the floor 170 to allow the cable 650 to pass through a plane of the floor 170.

In one aspect the at least one auxiliary control lever 610 may include a first arm 612, the second arm 614, and a cylindrical mount 616. The cylindrical mount 616 may be rotatably mounted onto an exterior of the auxiliary control support shaft 620. The first arm 612 may be attached to a knob or handle 618. The second arm 614 may include a coupling 615 to attach to an end of the cable 650. In one aspect, the at least one auxiliary control lever 610 may be rotated rearward, toward a rear of the operator cab 116. The second arm 614 of the at least one auxiliary control lever 610 may in turn cause an end of the cable 650 at or near the cable actuation bracket 630 to be pulled via a tensile force in a first direction. The cable 650 in turn may translate the pull motion through the cable housing 660 and cause an end of the cable 650 at or near the cable actuation mount 640 to be pulled upward through the floor 170 of the operator cab 116. The pulling motion of the cable 650 at or near the cable actuation mount 640 may in turn actuate a spring loaded valve actuation lever actuator 322 of a hydraulic control valve 320 towards a first operating position.

In one aspect, the at least one auxiliary control lever 610 may be rotated forward, toward a front of the operator cab 116. The second arm 614 of the at least one auxiliary control lever 610 may in turn release tension at the end of the cable 650 at or near the cable actuation bracket 630. A spring tension force of the spring loaded valve actuation lever actuator 322 actuate the hydraulic control valve 320 towards a second operating position and may assert a tensile force on the cable 650 in a second direction. The cable 650 in turn may translate the pull motion through the cable housing 660 and cause the cable 650 to be pulled downward through the floor 170 of the operator cab 116.

In one aspect, the auxiliary implement control layout 600 may include a plurality of auxiliary control levers 610 rotatably supported on the auxiliary control support shaft 620. The auxiliary implement control layout 600 may further include a corresponding number of cables 650 and cable housings 660. In select aspects, the auxiliary implement control layout 600 may include up to four auxiliary control levers 610 and a corresponding number of number of cables 650 and cable housings 660. In one aspect, the cable actuation bracket 630 and the cable actuation mount 640 may each include a plurality of openings to receive a plurality of cables 650 and/or cable housings 660. In select aspects, the cable actuation bracket 630 and the cable actuation mount 640 may each include up to four openings for receiving cables 650 and/or cable housings 660. By using cable actuation in the auxiliary implement control layout 600, an adjustability and range of motion of the support frame 540 may be further improved thereby providing further reach and positioning of the auxiliary control levers 610 for an operator.

Figure 15:
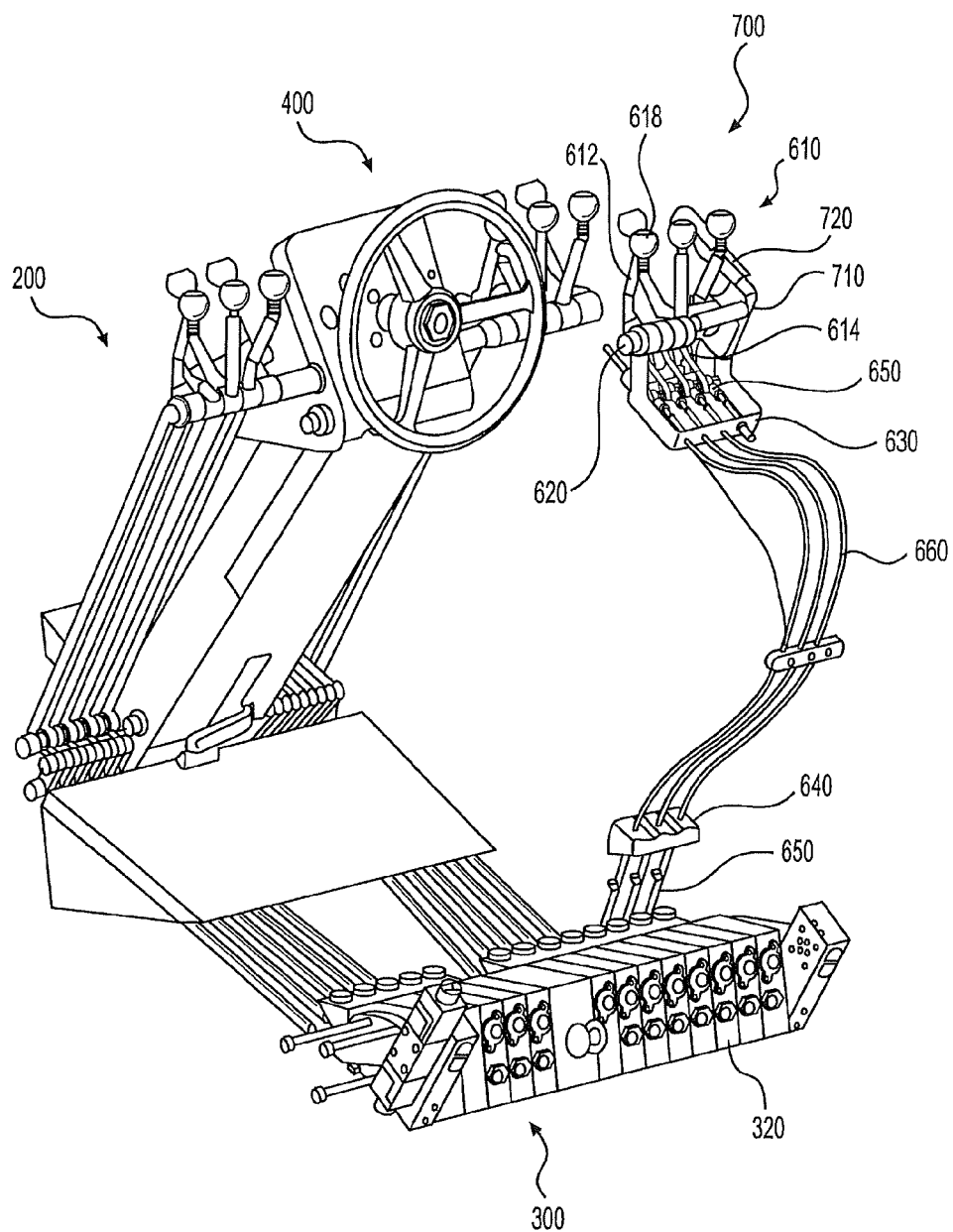
FIG. 15 is a perspective view of the main implement valve layout for a narrow front operator cab with a third exemplary auxiliary implement control layout.
Figure 16:
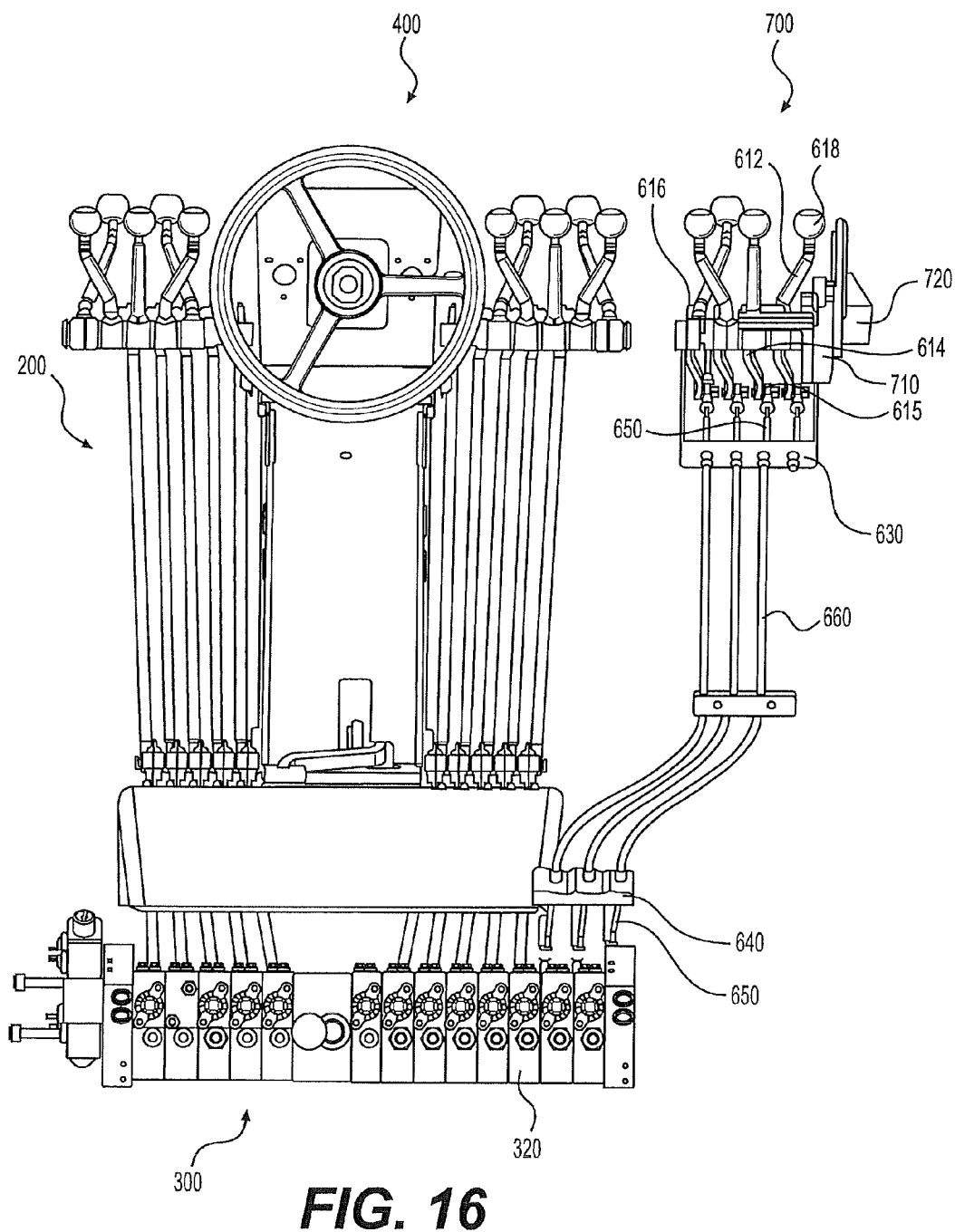
FIG. 16 is a front view of the main and auxiliary implement valve layout of FIG. 15.
Figure 17:
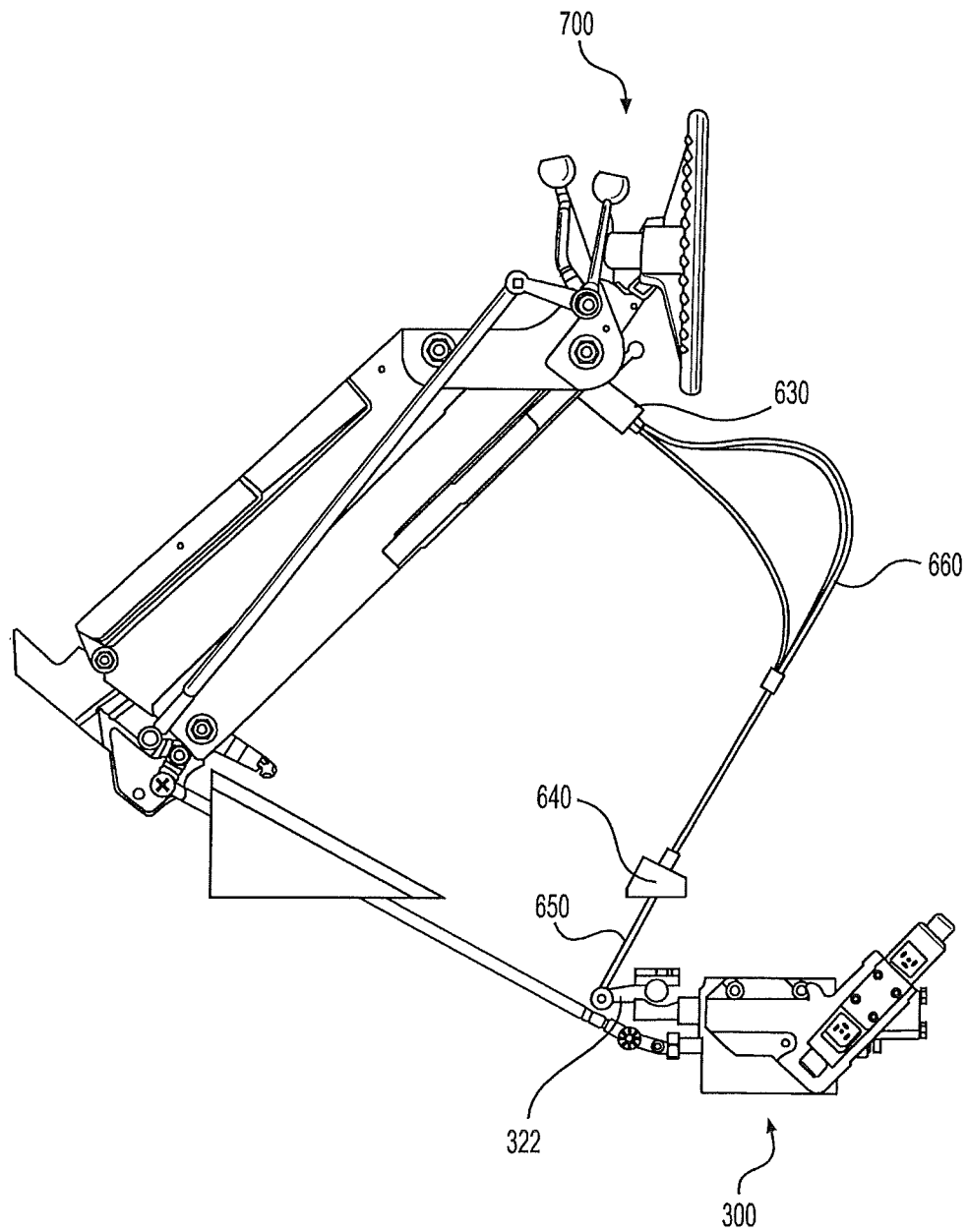
FIG. 17 is a side view of the main and auxiliary implement valve layout of FIG. 15.

Referring to FIGS. 15-17, a third exemplary auxiliary implement control layout 700 will now be discussed. The third exemplary auxiliary implement control layout 700 may include at least one auxiliary control lever 610, an auxiliary control support shaft 620, a cable actuation bracket 630, a cable actuation mount 640, a cable 650, and a cable housing 660, similar to those of the second exemplary auxiliary implement control layout 600. However, instead of mounting the at least one control lever 610 and the auxiliary control support shaft 620 to the support frame 540, an auxiliary mounting bracket 710 may be provided. In one aspect, the at least one auxiliary control lever 610, the auxiliary control support shaft 620, the cable actuation bracket 630 may be secured to the auxiliary mounting bracket 710. A first end of the auxiliary control support shaft 620 and/or the cable actuation bracket 630 may be fastened to the auxiliary mounting bracket 710.

In operation, the at least one auxiliary control lever 610 of the third exemplary auxiliary implement control layout 700 may be operated similar to the second exemplary auxiliary implement control layout 600, as described above. For example, in one aspect, the at least one auxiliary control lever 610 may be rotated rearward, toward a rear of the operator cab 116 to create tension on the cable 650, thereby pulling the cable 650 upward through the floor 170 and actuating the spring loaded valve actuation lever actuator 322 of a hydraulic control valve 320 towards a first operating position. Conversely, the at least one auxiliary control lever 610 may be rotated forward, toward a front of the operator cab 116 to release tension on the cable 650 thereby allowing the cable 650 to be pulled downward through the floor 170 and releasing the spring loaded valve actuation lever actuator 322 of a hydraulic control valve 320 to move towards a second operating position.

In one aspect the auxiliary mounting bracket 710 may be attached to a frame mount 720. The frame mount 720 may be secured to a frame member of the operator cab 116. In one aspect, the frame mount 720 may be secured to one of the side support bars 176 of the operator cab 116. In one aspect, the auxiliary mounting bracket 710 and the frame mount 720 may include an adjustable coupling between the auxiliary mounting bracket 710 and the frame mount 720. In select aspects, the auxiliary mounting bracket 710 and the frame mount 720 may include a track and rail coupling to allow relative adjustment between the auxiliary mounting bracket 710 and the frame mount 720. In one aspect, a position of the auxiliary mounting bracket 710 with respect to the frame mount 720 may be slidably set and secured via one or more fasteners, such as for example, a set screw, a thumb screw, mechanical fastener, or the like. In select aspects, the coupling between the auxiliary mounting bracket 710 and the frame mount 720 may be oriented an angle, thereby the auxiliary mounting bracket 710 may be repositioned vertically with respect to the floor 170 and/or forwardly/rearwardly with respect to a forward direction of the operator cab 116, thereby adjusting a location of the at least one control lever 610 with respect to an operator.

INDUSTRIAL APPLICABILITY

The disclosure is applicable to controls for machines in general, and to motor graders with narrow front end cabs. Referring to FIGS. 1-4, a machine 100 such as a motor grader, may be used in various operations such as road building, snow removal, earth moving, plowing, etc. The machine 100 may include a rear frame section 102, a front frame section 104, blade assembly 114, and an operator cab 116. As shown in FIGS. 2-4, the operator cab 116 may include a floor 170, a roof 175, front vertical support bars 172, rear corner vertical support bars 174, side support bars 176, and edges 178 of the floor 170. A door structure or a window structure may be installed in an opening formed between the floor 170, the roof 175, the front vertical support bars 172, and the side support bars 176.

In one aspect, the front vertical support bars 172 and side support bars 176, together with the edges 178 for the floor 170 and the roof 175, may house the door structure or window pane structure, which may include a transparent panel to enable an operator to see outside of the operator cab 116. In one aspect, the edges 178 of the floor 170 may be angled inwards 20-50 degrees with respect to a plane of the floor 170. In one aspect, the edges 178 may be angled 30 degrees. The inward taper of the operator cab 116 forms a narrow front end 180 of operator cab 116, but increases a length at the edges 178, thereby creating a larger visual opening to improve outward visibility and may provide better line of sight to the front wheels 118 and the blade 120.

Referring to FIGS. 4-8, a main implement control system 200 may be installed on the machine 100 to provide controls for operation of the machine 100 without affecting adjustability of the controls or provide large obstructions to outward visibility via visual openings between the front vertical support bars 172 and side support bars 176. In one aspect, a hydraulic valve block 300 may be mounted below the floor 170 of the operator cab 116. By placing the hydraulic valve block 300 below the floor 170, obstruction and clutter within the operator cab 116 may be reduced and visibility out of the operator cab 116 may be improved. For example, by placing the hydraulic valve block 300 below the floor 170, the hydraulic valve block would not need to be co-located with or adjacent to a steering column 400, which may be used to support the main implement control system 200. In one aspect, by mounting the hydraulic valve block 300 below the floor 170, accessibility to the hydraulic valve block 300 may be improved. For example, an access panel may be provided over an access opening 173 in the floor 170 directly above the hydraulic valve block 300 for improved access to the hydraulic valve block 300 during service, maintenance, and/or repair operations, for example.

The main implement control system 200 may include at least a control lever 210, a control support shaft 220, a first linkage 230, a second linkage 240, and a bell crank 250. The control lever 210 may be rotatably supported on the control support shaft 220. The control lever 210 may be attached to an upper end 231 of the first linkage 230, a lower end 232 of the first linkage 230 may be attached to a first portion 252 of the bell crank 250, and a second portion 254 of the bell crank 250 may be connected to a hydraulic control valve 310 of the hydraulic valve block 300. In operation, rotation of the control lever 210 may cause the first linkage 230 and the second linkage 240 to translate and actuate an actuator 311 of the hydraulic control valve 310 between at least a first position and a second position.

In one aspect, the first linkage 230 may extend downwardly toward a narrow front end 180 of operator cab 116. In one aspect, the first linkage 230 may extend downwardly and inwardly towards a center of the steering column 400. By providing a downward and forward slope, and/or a downward and inward slope, outward visibility from the operator cab 116 and line of sight towards components of the machine 100, such as the front wheels 118 or the blade 120, may be improved.

In one aspect, the floor 170 may include a cutout or opening 173. The second linkage 240 may extend through the opening 173 downwardly towards a rearward direction of the operator cab 116. In one aspect, a cover 171 may be included to at least partially close the opening 173 while allowing the second linkage 240 to pass through below a plane of the floor 170. In one aspect, the cover 171 may have a triangular profile with a slope approximately the same as a slope of the second linkage 240 extending from the bell crank 250 to the hydraulic valve block 300. The cover 171 may provide a barrier between actuating components of the main implement control system 200, such as the second linkage 240, and may isolate an interior of the operator cab 116. The cover 171 may be disassembled and removed from the floor 170 via fasteners and/or latches to allow access to the main implement control system 200 for service, maintenance, and/or repair. In one aspect, the cover 171 may serve as a foot rest for the operator during a seated position and/or serve as a base for mounting one or more pedal actuators 179 to control the machine 100, such as braking or acceleration of the machine 100.

Referring to FIGS. 10-17, the machine 100 may be retrofitted and/or upgraded with additional features and/or equipment, and at least one of an auxiliary implement control layout 500, 600, 700 may be installed to enable an operator to access and maneuver additional features and/or equipment. The first and second auxiliary implement control layouts 500, 600 may be supported via a support frame 540 and a base 550. The support frame 540 may be pivotally mounted to the base 550 at a first portion, and mounted to the base 550 at a second portion via a strut 560. In one aspect, the auxiliary implement control layouts 500, 600, including at least one auxiliary control lever 510, 610, may be repositioned by adjusting a length of the strut 560 in order to improve reach and/or ergonomics to an operator.

The third exemplary auxiliary implement control layout 700 may include a frame mount 720, which may be secured to a frame member of the operator cab 116. In one aspect, the frame mount 720 may be secured to one of the side support bars 176 of the operator cab 116. In one aspect, the auxiliary mounting bracket 710 and the frame mount 720 may include an adjustable coupling between the auxiliary mounting bracket 710 and the frame mount 720. In one aspect adjustable coupling may enable a position of the auxiliary mounting bracket 710 to be adjusted, and at least one auxiliary control lever 610 associated with the third exemplary auxiliary implement control layout 700 may be repositioned in order to improve reach and/or ergonomics for an operator. In one aspect, visibility out of the operator cab 116 may be improved, while providing the additional controls since the third exemplary auxiliary implement control layout 700 may be mounted to one of the side support bars 176 of the operator cab 116, thereby eliminating the need for additional support structures that may interfere with visibility of an operator out of the operator cab 116.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A control lever system for a machine, the control lever comprising:
    a support column including an upper portion and a lower portion,
        wherein the support column includes a steering column, and
        wherein a steering wheel is rotatably supported on the steering column;
    a first support shaft connected to the upper portion of the support column;
    a second support shaft connected to the lower portion of the support column;
    at least one control lever rotatably supported on the first support shaft;
    at least one bell crank rotatably supported on the second support shaft; and
    a hydraulic valve block mounted below a floor of the machine;
    wherein a first linkage is attached to the at least one control lever and to the at least one bell crank to translate motion from the at least one control lever to the at least one bell crank, and
    wherein a second linkage is attached to the at least one bell crank and the hydraulic valve block to translate motion from the at least one bell crank in order to adjust an operating position of a hydraulic control valve of the hydraulic valve block mounted below the floor of the machine.

2. The control lever system of claim 1, wherein the first support shaft extends laterally through the support column.

3. The control lever system of claim 2, wherein the at least one control lever includes a first set of control levers and a second set of control levers,
    wherein the first set of control levers are mounted to the first support shaft on a first side of the support column, and
    wherein the second set of control levers are mounted to the first support shaft on a second side of the support column opposite the first side of the support column.

4. The control lever system of claim 1, wherein the first linkage is a straight rod.

5. The control lever system of claim 1, wherein the second linkage is a straight rod.

6. The control lever system of claim 1, wherein the first linkage extends inwardly towards a center of the support column in a direction from the at least one control lever to the at least one bell crank.

7. The control lever system of claim 1, wherein the at least one control lever includes a plurality of control levers, and the at least one bell crank includes a respective bell crank for each of the plurality of control levers.

8. The control lever system of claim 7, wherein each control lever of the plurality of control levers is attached to their respective bell crank via a respective first linkage.

9. The control lever system of claim 8, wherein each respective first linkage extends inwardly towards a center of the support column in a first direction from the plurality of control levers to their respective bell crank.

10. The control lever system of claim 8, wherein each bell crank is attached to a respective hydraulic control valve of the hydraulic valve block via a respective second linkage.

11. The control lever system of claim 10, wherein each respective second linkage extends in a second direction downwardly through a plane of the floor of the machine.

12. The control lever system of claim 10, wherein the floor of the machine includes an opening,
    wherein each respective second linkage extends downwardly through the opening of the floor, and
    wherein a cover at least partially covers over the opening of the floor while allowing each respective second linkage to pass through the opening.

13. An operator cab of a machine including a control lever system, the operator cab comprising:
    a frame having a pair of front vertical support bars, a pair of side support bars, and a floor extending at least between the pair of front vertical support bars and pair of side support bars;
    a support column mounted to the frame, the support column including an upper portion and a lower portion,
        wherein the support column includes a steering column, and
        wherein a steering wheel is rotatably supported on the steering column;
    a first support shaft connected to the upper portion of the support column;
    a second support shaft connected to the lower portion of the support column;
    at least one control lever rotatably supported on the first support shaft;
    at least one bell crank rotatably supported on the second support shaft; and
    a hydraulic valve block mounted below the floor of the frame;
    wherein a width of the pair of front vertical support bars is smaller than a width of the pair of side support bars, and a width of the floor narrows in a forward direction of the operator cab,
    wherein a first linkage is attached to the at least one control lever and to the at least one bell crank to translate motion from the at least one control lever to the at least one bell crank, and wherein a second linkage is attached to the at least one bell crank and the hydraulic valve block to translate motion from the at least one bell crank in order to adjust an operating position of the hydraulic valve block mounted below the floor of the frame.

14. The operator cab of claim 13, wherein the at least one control lever include a plurality of control levers, and the at least one bell crank includes a respective bell crank for each of the plurality of control levers.

15. The operator cab of claim 14, wherein each control lever of the plurality of control levers is attached to their respective bell crank via a respective first linkage.

16. The operator cab of claim 15, wherein each of the first linkage extends inwardly towards a center of the support column in a direction from the plurality of control levers to their respective bell crank.

17. The operator cab of claim 15, wherein each bell crank is attached to a respective hydraulic control valve of the hydraulic valve block via a respective second linkage.

18. The operator cab of claim 17, wherein each respective second linkage extends downwardly through a plane of the floor of the machine.

19. The operator cab of claim 17, wherein the floor of the machine includes an opening, wherein each respective second linkage extends downwardly through the opening of the floor, and wherein a cover at least partially covers over the opening of the floor while allowing each respective second linkage to pass through the opening.

20. A motor grader with a narrow front end operator cab, the motor grader comprising:

a front frame section supporting a blade assembly;

a rear frame section including an engine compartment;

a cab frame located between the front frame section and the rear frame section, the cab frame including a pair of front vertical support bars, a pair of side support bars, and a floor extending at least between the pair of front vertical support bars and pair of side support bars;

a support column mounted to the cab frame, the support column including an upper portion and a lower portion, wherein the support column includes a steering column, and wherein a steering wheel is rotatably supported on the steering column;

a first support shaft connected to the upper portion of the support column;

a second support shaft connected to the lower portion of the support column;

at least one control lever rotatably supported on the first support shaft;

at least one bell crank rotatably supported on the second support shaft; and a hydraulic valve block mounted below the floor of the cab frame;

wherein a width of the pair of front vertical support bars is smaller than a width of the pair of side support bars, and a width of the floor narrows in a forward direction of the narrow front end operator cab, wherein a first linkage is attached to the at least one control lever and to the at least one bell crank to translate motion from the at least one control lever to the at least one bell crank, and wherein a second linkage is attached to the at least one bell crank and the hydraulic valve block to translate motion from the at least one bell crank in order to adjust an operating position of the hydraulic valve block mounted below the floor of the cab frame.

* * * * *